(12) United States Patent
Hatakeyama et al.

(10) Patent No.: US 10,645,320 B2
(45) Date of Patent: May 5, 2020

(54) IMAGE PICKUP APPARATUS, CONTROL METHOD FOR IMAGE PICKUP APPARATUS, AND COMPUTER-READABLE NON-TRANSITORY RECORDING MEDIUM IN WHICH CONTROL PROGRAM FOR IMAGE PICKUP APPARATUS IS RECORDED

(71) Applicant: Olympus Corporation, Hachioji-shi, Tokyo (JP)

(72) Inventors: Ryo Hatakeyama, Hino (JP); Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 24 days.

(21) Appl. No.: 16/109,625

(22) Filed: Aug. 22, 2018

(65) Prior Publication Data
US 2019/0082131 A1    Mar. 14, 2019

(30) Foreign Application Priority Data
Sep. 8, 2017    (JP) .................. 2017-173211

(51) Int. Cl.
*H04N 5/369* (2011.01)
*H04N 5/378* (2011.01)
*H04N 5/3745* (2011.01)
*H04N 5/343* (2011.01)

(52) U.S. Cl.
CPC ......... *H04N 5/36961* (2018.08); *H04N 5/343* (2013.01); *H04N 5/378* (2013.01); *H04N 5/37457* (2013.01)

(58) Field of Classification Search
CPC ............... H04N 5/36961; H04N 5/343; H04N 5/37457; H04N 5/378; H04N 9/045; H04N 5/23212
See application file for complete search history.

(56) References Cited

U.S. PATENT DOCUMENTS

| | | | | |
|---|---|---|---|---|
| 2013/0076972 | A1* | 3/2013 | Okita | H04N 5/23212 348/360 |
| 2014/0293115 | A1* | 10/2014 | Sambonsugi | H04N 5/23212 348/349 |

(Continued)

FOREIGN PATENT DOCUMENTS

JP    2014-216866    11/2014

*Primary Examiner* — Timothy J Henn
(74) *Attorney, Agent, or Firm* — John C. Pokotylo; Pokotylo Patent Services

(57) ABSTRACT

An image pickup apparatus includes a pixel section in which a pixel for image is divided into a plurality of pixels for focus detection that generate photoelectric conversion signals, the pixel section generating a pixel signal for image and pixel signals for focus detection on the basis of the photoelectric conversion signals, and a device control section or the like configured to control the pixel section to perform, in a frame, first readout for generating both of a pair of the pixel signals for focus detection and reading out the pair of pixel signals for focus detection and perform, in another frame, second readout for generating one of the pair of pixel signals for focus detection, adding up the photoelectric conversion signals to generate the pixel signal for image, and reading out one of the generated pixel signals for focus detection and the pixel signal for image.

20 Claims, 16 Drawing Sheets

(56) References Cited

U.S. PATENT DOCUMENTS

| | | | |
|---|---|---|---|
| 2015/0256778 A1* | 9/2015 | Kusaka | G03B 13/36 |
| | | | 348/302 |
| 2015/0288901 A1* | 10/2015 | Tanaka | H01L 27/14605 |
| | | | 250/208.1 |
| 2016/0198105 A1* | 7/2016 | Kawai | G03B 13/36 |
| | | | 348/251 |
| 2016/0353005 A1* | 12/2016 | Kaibara | H04N 5/23212 |
| 2017/0155855 A1* | 6/2017 | Ito | H04N 5/357 |
| 2017/0208270 A1* | 7/2017 | Oota | H04N 5/3572 |
| 2017/0307371 A1* | 10/2017 | Ito | G03B 13/36 |

\* cited by examiner

FIG. 18

|  | DISPLAY/RECORDING | | FOCUS DETECTION | |
|---|---|---|---|---|
|  | S/N | D RANGE | S/N | D RANGE |
| TIMING CHART(1) (A, B) | △ | △ | ○ | ○ |
| TIMING CHART(2) (A+B, A) | ○ | ○ | △ | △ |
| TIMING CHART(3) (A+B) | ○ | ○ | — | — |

FIG. 19

| DATA FOR FOCUS DETECTION | PRIORITY | TIMING CHART IN USE |
|---|---|---|
| NECESSARY | PIXEL FOR FOCUS DETECTION | TIMING CHART(1) (A, B) |
| | PIXEL FOR IMAGE | TIMING CHART(2) (A+B, A) |
| UNNECESSARY | — | TIMING CHART(3) (A+B) |

IMAGE PICKUP APPARATUS, CONTROL METHOD FOR IMAGE PICKUP APPARATUS, AND COMPUTER-READABLE NON-TRANSITORY RECORDING MEDIUM IN WHICH CONTROL PROGRAM FOR IMAGE PICKUP APPARATUS IS RECORDED

CROSS REFERENCE TO RELATED APPLICATION

This application claims benefit of Japanese Application No. 2017-173211 filed in Japan on Sep. 8, 2017, the entire contents of which are incorporated herein by this reference.

BACKGROUND OF THE INVENTION

1. Field of the Invention

The present invention relates to an image pickup apparatus in which a pixel for image corresponding to a micro-lens is divided into a plurality of pixels for focus detection, a control method for the image pickup apparatus, and a computer-readable non-transitory recording medium in which a control program for the image pickup apparatus is recorded.

2. Description of the Related Art

An image pickup device in which a pixel for image corresponding to a micro-lens is divided into a plurality of pixels for focus detection to enable the image pickup device alone to acquire information for phase difference detection has been proposed and commercialized.

For example, Japanese Patent Application Laid-Open Publication No. 2014-216866 describes an image pickup apparatus in which one pixel including one micro-lens includes two photoelectric conversion sections, the image pickup apparatus writing, in first writing processing, a signal provided from one photoelectric conversion section of the pixel in a first capacitor, writing, in second writing processing, a signal obtained by adding up signals provided from the two photoelectric conversion sections in a second capacitor, using the added-up signal as an image pickup signal, and using a first signal and a differential signal between the added-up signal and the first signal for focus detection.

SUMMARY OF THE INVENTION

An image pickup apparatus according to an aspect of the present invention includes: an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals; and a processor including hardware. The processor controls the image pickup section to perform, in a frame, first readout for generating both of a pair of the pixel signals for focus detection in a first pupil dividing direction on the basis of the photoelectric conversion signals and reading out the pair of pixel signals for focus detection and perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, and reading out one of the generated pixel signals for focus detection and the pixel signal for image.

A control method for an image pickup apparatus according to another aspect of the present invention is a control method for an image pickup apparatus including an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals. The control method includes controlling the image pickup section to perform, in a frame, first readout for generating both of a pair of the pixel signals for focus detection in a first pupil dividing direction on the basis of the photoelectric conversion signals and reading out the pair of pixel signals for focus detection and perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, and reading out one of the generated pixel signals for focus detection and the pixel signal for image.

A computer-readable non-transitory recording medium in which a control program for an image pickup apparatus is recorded according to yet another aspect of the present invention is a computer-readable non-transitory recording medium in which a control program for an image pickup apparatus is recorded, the image pickup apparatus including an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals. The control program controls the image pickup section to perform, in a frame, first readout for generating both of a pair of the pixel signals for focus detection in a first pupil dividing direction on the basis of the photoelectric conversion signals and reading out the pair of pixel signals for focus detection and perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, and reading out one of the generated pixel signals for focus detection and pixel signal for image.

BRIEF DESCRIPTION OF THE DRAWINGS

FIG. 18 is a table for explaining superiority and inferiority in S/Ns and dynamic ranges of pixel signals for display/recording and pixel signals for focus detection acquired in each of the pixel for focus detection preferential mode, the pixel for image preferential mode, and the image only mode in the first embodiment;

FIG. 19 is a table in which timing charts according to which the image pickup device is driven are classified according to necessity/unnecessity of data for focus detection and according to which of the pixel for focus detection and the pixel for image is prioritized in the first embodiment;

DETAILED DESCRIPTION OF THE PREFERRED EMBODIMENT

An embodiment of the present invention is explained below with reference to the drawings.

First Embodiment

Figure 1:
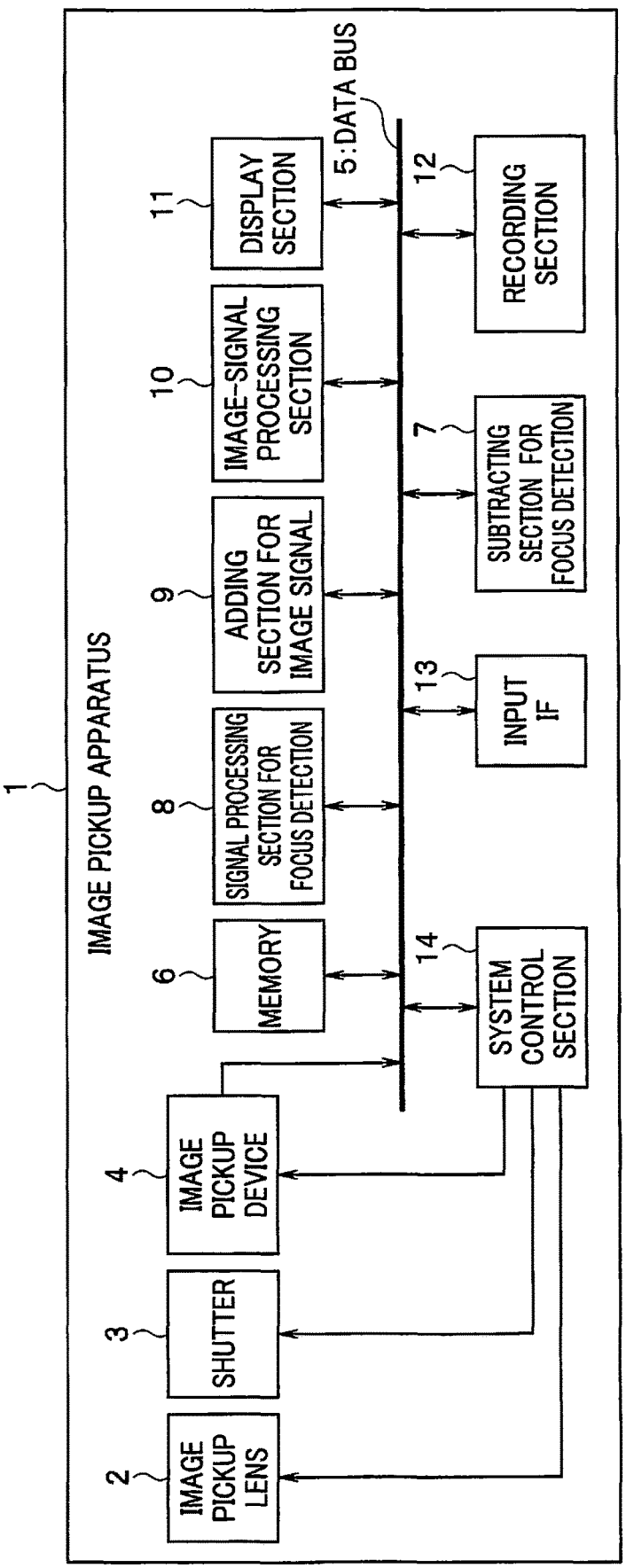
FIG. 1 is a block diagram showing a configuration of an image pickup apparatus in a first embodiment of the present invention.

FIGS. 1 to 23 show a first embodiment of the present invention. FIG. 1 is a block diagram showing a configuration of an image pickup apparatus.

As shown in FIG. 1, an image pickup apparatus 1 includes an image pickup lens 2, a shutter 3, an image pickup device 4, a data bus 5, a memory 6, a subtracting section for focus detection 7, a signal processing section for focus detection 8, an adding section for image signal 9, an image-signal processing section 10, a display section 11, a recording section 12, an input interface (input IF) 13, and a system control section 14 and includes a function of a so-called camera.

The image pickup lens 2 is a photographing optical system for forming an optical image of an object on the image pickup device 4. The image pickup lens 2 includes a focus lens for adjusting a focus position and an optical aperture configured to control a range of light beams passing through the image pickup lens 2. The image pickup lens 2 is configured as, for example, a zoom lens, a focal length of which can be changed. The focus position of the image pickup lens 2, an opening diameter (an aperture value) of the optical aperture, and the focal length are changed by driving control of the system control section 14.

The shutter 3 controls a time period in which a light beam from the image pickup lens 2 reaches the image pickup device 4. The shutter 3 is a mechanical shutter having a configuration for causing a shutter curtain to travel such as a focal plane shutter. An opening and closing operation of the shutter 3 is controlled to be driven by the system control section 14.

The image pickup device 4 is included in an image pickup section and includes a pixel section 22 (see FIG. 2) on which a plurality of pixels for image are two-dimensionally arrayed. The pixel for image corresponds to a micro-lens L (see FIG. 3) and is divided into a plurality of pixels for focus detection. The pixels for focus detection respectively photoelectrically convert light beams passing regions formed by dividing an exit pupil of the image pickup lens 2, which is a photographing optical system, into a plurality of pupils and generate photoelectric conversion signals. In this way, in the pixel section 22, the plurality of pixels for focus detection are considered to be two-dimensionally arrayed.

The image pickup device 4 photoelectrically converts, as explained above, an optical image of the object formed by the image pickup lens 2 through the shutter 3 and generates a plurality of photoelectric conversion signals on the basis of control by the system control section 14.

Such an image pickup device 4 is configured as, for example, a single-plate CMOS image pickup device including a color filter of a primary color Bayer array. However, naturally, the image pickup device 4 is not limited to the configuration.

The image pickup device 4 in the embodiment is capable of operating, on the basis of the control by the system control section 14, according to a pixel for focus detection preferential mode (a simple readout scheme) for performing first readout, a pixel for image preferential mode (a subtraction readout scheme) for performing second readout, and an image only mode (a readout scheme without phase differential information) for performing third readout.

In an example in which one pixel for image is divided into, for example, two pixels for focus detection A and B, in the pixel for focus detection preferential mode (the simple readout scheme), a pair of pixel signals for focus detection A and B are respectively outputted from the image pickup device 4 by the first readout. In the pixel for image preferential mode (the subtraction readout scheme), one of the pair of pixel signals for focus detection A and B (assumed to be, for example, the pixel signal for focus detection A) and a pixel signal for image (A+B) obtained by adding up the pair of pixel signals for focus detection A and B are outputted from the image pickup device 4 by the second readout. Further, in the image only mode (the readout scheme without phase difference information), only the pixel signal for image (A+B) obtained by adding up the pair of pixel signals for focus detection A and B is outputted and both of the pixel signals for focus detection A and B are not outputted by the third readout.

The data bus 5 is a transfer path for transferring various data and control signals from a certain place in the image pickup apparatus 1 to other places. The data bus 5 in the embodiment is connected to the image pickup device 4, the memory 6, the subtracting section for focus detection 7, the signal processing section for focus detection 8, the adding section for image signal 9, the image-signal processing section 10, the display section 11, the recording section 12, the input IF 13, and the system control section 14.

The memory 6 is a storing section configured to temporarily store a pixel signal generated by the image pickup device 4. The memory 6 is configured by, for example, a DRAM (dynamic random access memory). The memory 6 is also used as a work memory or a buffer memory for images when the respective sections in the image pickup apparatus 1 perform various kinds of processing such as image processing and focus detection.

The subtracting section for focus detection 7 is configured by a processor or the like including hardware. When the second readout of the subtraction readout scheme explained above is performed, the subtracting section for focus detection 7 subtracts one of a pair of pixel signals for focus detection from a pixel signal for image to generate the other of the pair of pixel signals for focus detection (or "restore the other"). In the first readout of the simple readout scheme explained above, the pixel signals for focus detection A and B outputted from the image pickup device 4 can be directly used for phase difference detection. On the other hand, in the second readout of the subtraction readout scheme, a pixel signal for focus detection necessary for performing phase difference detection (the pixel signal for focus detection B in the example explained above) is insufficient. Therefore, the subtracting section for focus detection 7 performs, for example, subtraction of {(A+B)−A} to restore the pixel signal for focus detection B.

The signal processing section for focus detection 8 is configured by a processor or the like including hardware. The signal processing section for focus detection 8 performs image surface phase difference detection on the basis of both of the pair of pixel signals for focus detection outputted from the image pickup device 4 in the simple readout scheme or one of the pair of pixel signals for focus detection outputted from the image pickup device 4 in the reduction readout scheme and the other of the pair of pixel signals for focus detection restored by the subtracting section for focus detection 7.

The signal processing section for focus detection 8 in the embodiment can further perform focus detection (contrast AF) based on contrast of a pixel signal for image in addition to focus detection (phase difference AF) of the phase difference detection scheme based on a pixel signal for focus detection.

The signal processing section for focus detection 8 calculates, on the basis of a result of the focus detection, a lens control parameter for moving a focus position of the image pickup lens 2 to a focus position. In addition, the signal processing section for focus detection 8 can also perform an arithmetic operation for the pixel signal for focus detection and calculate, for example, 3D information, a depth map, or depth correction information. When calculating the 3D information, the depth map, the depth correction information, or the like, the signal processing section for focus detection 8 transmits a result of the calculation to the image-signal processing section 10.

The adding section for image signal 9 is configured by a processor or the like including hardware. When the first readout of the simple readout scheme explained above is performed, the adding section for image signal 9 adds up both of the pair of pixel signals for focus detection to generate a pixel signal for image if necessary. More specifically, the adding section for image signal 9 adds up the pixel signals for focus detection (A and B in the example explained above) outputted from the image pickup device 4 in the simple readout scheme to thereby restore a pixel signal for image (A+B).

The image-signal processing section 10 is configured by a processor or the like including hardware. The image-signal processing section 10 performs image processing on the pixel signal for image outputted from the image pickup device 4 in the subtraction readout scheme or the readout scheme without phase difference information or the pixel signal for image outputted from the image pickup device 4 in the simple readout scheme and restored by the adding section for image signal 9 and generates an image for display and/or recording (e.g., an image to be displayed on the display section 11 or an image to be recorded in the recording section 12).

The image-signal processing section 10 performs, on the pixel signal for image, image processing (including so-called development processing) such as OB subtraction, white balance (WB) gain, demosaicing, noise reduction, color conversion, gamma conversion, and expansion and reduction. Note that data compression/data expansion in recording a still image or a moving image in the recording section 12 or reading out the still image or the moving image from the recording section 12 may be performed by the image-signal processing section 10 or may be performed by providing a dedicated compressing and expanding section.

The display section 11 is a display device configured to display an image and display various kinds of information related to the image pickup apparatus 1. The display section 11 includes a device such as an LCD panel or an organic electroluminescence (organic EL) display. Specific disposition and configuration of the display section 11 include an electronic view finder (EVF), a back panel of the image pickup apparatus 1, and a display apparatus of a portable device wirelessly connected to the image pickup apparatus 1. Therefore, the display section 11 is not limited to be a component peculiar to the image pickup apparatus 1.

The recording section 12 is a recording section configured to store, in a nonvolatile manner, image data (still image data, movie data, etc.) formed by a plurality of pixel signals. The recording section 12 is configured by, for example, a flash memory incorporated in a main body of the image pickup apparatus 1 or a memory card detachably attachable to the main body of the image pickup apparatus 1. Therefore, the recording section 12 is not limited to be a component peculiar to the image pickup apparatus 1.

The input IF 13 is a section for performing various operation inputs to the image pickup apparatus 1. The input IF 13 includes, for example, a power button for turning on and off a power supply of the image pickup apparatus 1, a release button for instructing a photographing start of an image, a reproduction button for performing reproduction of a recorded image, a menu button for performing setting and the like of the image pickup apparatus 1, and operation buttons such as a cross key used for selection operation for an item and an OK button used for decision operation for a selected item.

Items that can be set using the menu button, the cross key, the OK button, and the like include, for example, photographing modes (a still image photographing mode, a moving image photographing mode, etc.) and recording modes (JPEG recording, RAW+JPEG recording, etc.), and a reproduction mode.

It is assumed that the input IF 13 includes, as function buttons, a first button for selecting processing for AF, a second button for selecting processing for a still image, and a third button for selecting processing for a moving image (see FIG. 20 referred to below). Note that, when all of the first to third buttons are off, processing for live view (LV) is selected.

When operation is performed on the input IF 13, a signal corresponding to operation content is outputted to the system control section 14.

Note that specific disposition and configuration of the input IF 13 include buttons and switches disposed on an exterior of a camera body, a touch panel provided on a display surface of a rear panel in the display section 11, and a remote release device or a portable device for remotely operating the image pickup apparatus 1. Therefore, the input IF 13 is not limited to be a component peculiar to the image pickup apparatus 1.

The system control section 14 includes a processor including hardware such as a CPU. The system control section 14 is a control section configured to collectively control the respective sections in the image pickup apparatus 1.

The system control section 14 executes various sequences corresponding to operation inputs from the input IF 13 according to predetermined processing programs (including an image pickup program). The processing programs may be stored in the system control section 14 in a nonvolatile manner or may be stored in the memory 6 in a nonvolatile manner and read by the system control section 14.

For example, the system control section 14 controls the focus lens of the image pickup lens 2 on the basis of a lens control parameter calculated by the signal processing section for focus detection 8, controls the aperture of the image pickup lens 2 and the shutter 3 on the basis of a result of an exposure operation performed in the system control section 14, and controls the image pickup device 4 to perform image pickup and output a pixel signal. The system control section 14 also performs control for displaying various kinds of information on the display section 11, control for recording data in or reading out data from the recording section 12, and the like.

Figure 2:
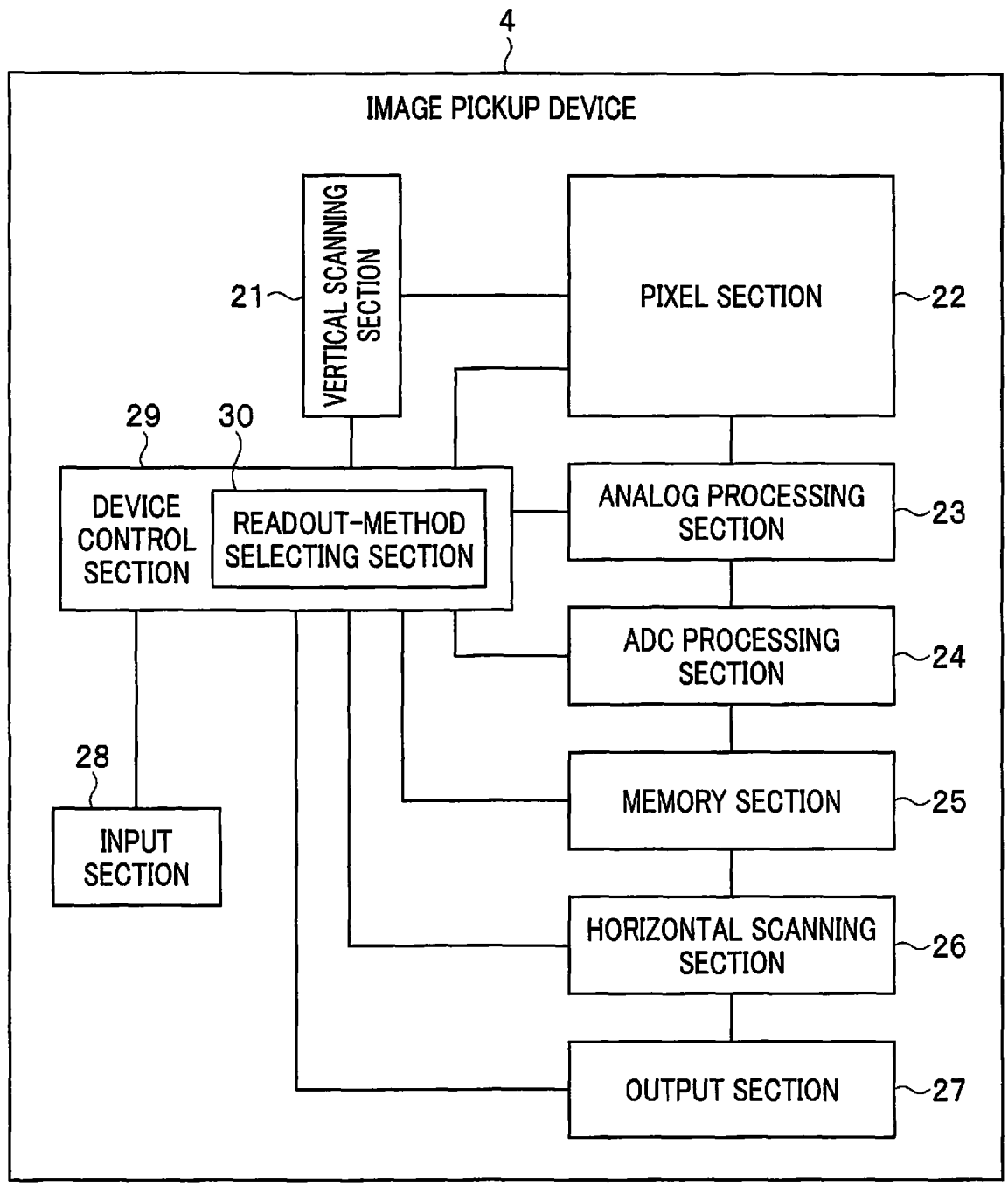
FIG. 2 is a block diagram showing a configuration of an image pickup device in the first embodiment.

FIG. 2 is a block diagram showing a configuration of the image pickup device 4.

The image pickup section includes a pixel for image divided into a plurality of pixels for focus detection. The image pickup section generates a pixel signal for image and a pixel signal for focus detection on the basis of photoelectric conversion signals generated by photoelectrically converting light beams with the pixels for focus detection. As explained above, the image pickup section includes the image pickup device 4.

In an example shown in FIG. 2, the image pickup device 4 includes a vertical scanning section 21, the pixel section 22, an analog processing section 23, an ADC processing section 24, a memory section 25, a horizontal scanning section 26, an output section 27, an input section 28, and a device control section 29.

The pixels for image (and the pixels or focus detection) are arrayed in the pixel section 22. The generation of the pixel signal for image and the pixel signals for focus detection based on the photoelectric conversion signals is performed by at least a part of the vertical scanning section 21 to the output section 27, the device control section 29, and the like.

Note that, in FIG. 2, a configuration example is shown in which the image pickup device 4 includes the vertical scanning section 21 and the pixel section 22 and further includes the analog processing section 23 to the device control section 29. However, the configuration of the image pickup device 4 is not limited to the configuration. For example, one of the analog processing section 23 to the device control section 29 or more may be disposed on an outside of the image pickup device 4.

As explained above, the pixel section 22 is a pixel array section in which the pixels for image (and the pixels for focus detection) are two-dimensionally arrayed (e.g., in a vertical direction (a column direction) and a horizontal direction (a row direction)).

Figure 3:
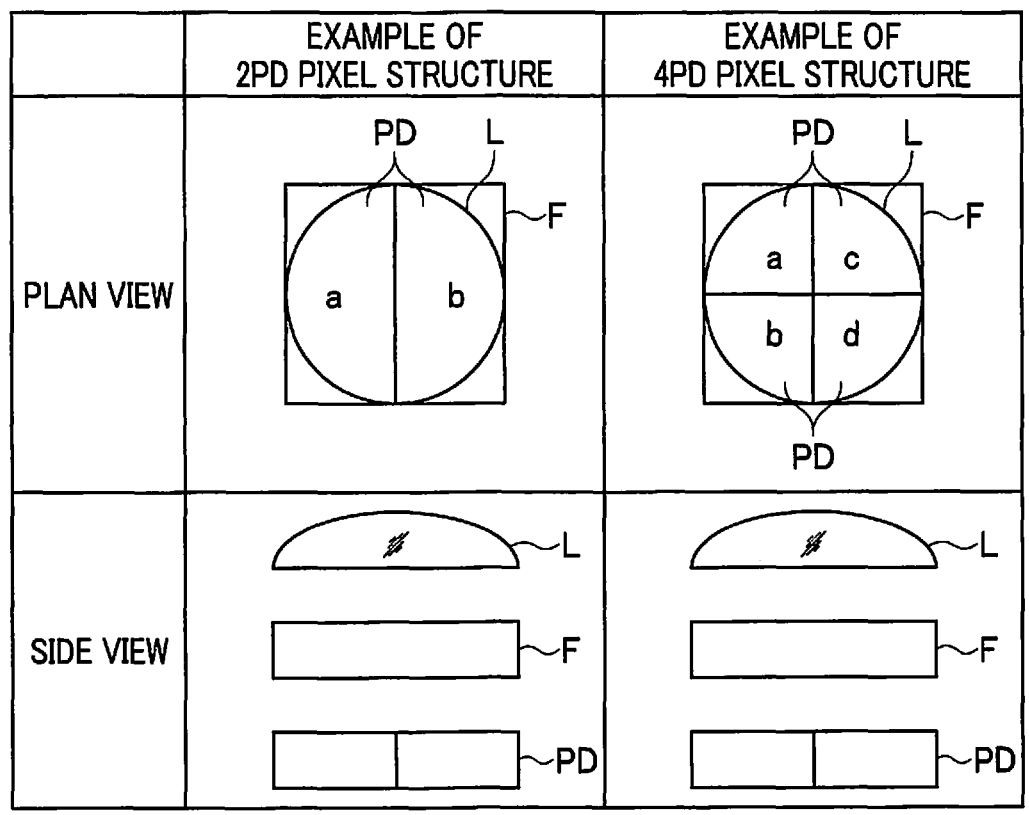
FIG. 3 is a table showing an example of a pixel structure in which two or four photodiodes are disposed in one micro-lens in the first embodiment.

FIG. 3 is a table showing an example of a pixel structure in which two or four photodiodes PD are disposed in one micro-lens L.

As a structure of the pixel for image, in FIG. 3, a 2PD pixel structure in which two photodiodes PD are disposed with respect to one micro-lens L and a 4PD pixel structure in which four photodiodes PD are disposed with respect to one micro-lens L are illustrated.

The pixel has a configuration in which the micro-lens L, the color filter F, and the photodiodes PD are disposed in order of a stacking direction from an object side to an image side. The micro-lens L collects lights to thereby increase an amount of light reaching the pixel for image and substantially increases an opening ratio of the pixel for image. For example, in the case of a color filter of a primary color Bayer array, any one of an R filter, a G filter, and a B filter is disposed in the color filter F according to a pixel position of the color filter F.

In the case of the 2PD pixel structure shown in FIG. 3, two photodiodes PD are disposed in an image forming range of one micro-lens L. When the two photodiodes PD are photodiodes for detecting a phase difference in the horizontal direction, the two photodiodes PD are divided into two, to the right and the left. When the two photodiodes PD are photodiodes for detecting a phase difference in the vertical direction, the two photodiodes PD are divided into two, to the upper and the lower. Consequently, two pixels for focus detection a and b are configured.

On the other hand, in the case of the 4PD pixel structure shown in FIG. 3, four photodiodes PD are disposed in the image forming range of one micro-lens L. The four photodiodes PD are divided into four, to the upper and the lower, and to the right and the left (i.e., the four photodiodes PD are respectively disposed in upper left, lower left, upper right, and lower right positions) for detecting the phase differences in the horizontal direction and in the vertical direction. Consequently, four pixels for focus detection a, b, c, and d are configured.

In the following explanation, an example is explained in which all the pixels of the pixel section 22 have the 4PD pixel structure (however, a part of the pixels of the pixel section 22 may have the 4PD pixel structure or the 2PD pixel structure). When all the pixels of the pixel section 22 have the 4PD pixel structure, pixel signals outputted from the respective photodiodes PD are pixel signals for focus detection.

Figure 4:
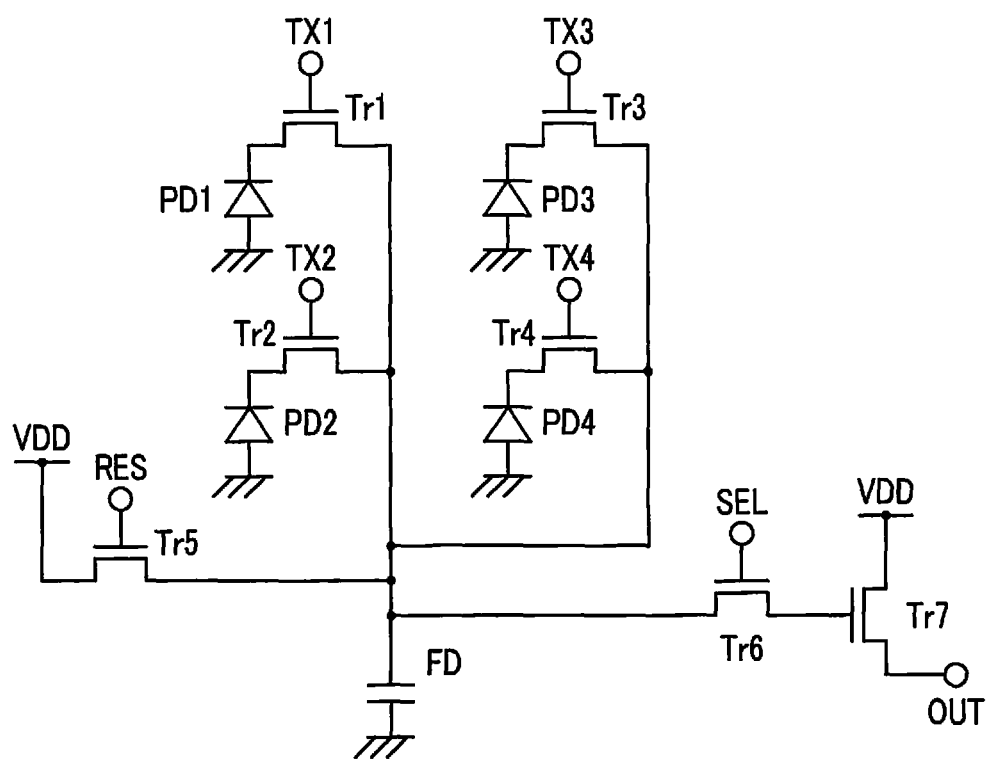
FIG. 4 is a circuit diagram showing a configuration example of a pixel having a 4PD pixel structure in the first embodiment.

Further, when outputs of the photodiodes PD of two pixels in the vertical direction are added up according to a circuit configuration shown in FIG. 4, that is, when (a+b) and (c+d) in FIG. 3 are calculated, the pixel signals for focus detection become pixel signals for focus detection for detecting a phase difference in the horizontal direction (vertical line detection).

When outputs of the photodiodes PD of two pixels in the horizontal direction are added up, that is, when (a+c) and (b+d) in FIG. 3 are calculated, the pixel signals for focus detection become pixel signals for focus detection for detecting a phase difference in the vertical direction (horizontal line detection).

In the case of the 4PD pixel structure shown in FIG. 3, one of the pixel signals for focus direction for the vertical line detection and the pixel signals for focus detection for the horizontal line detection becomes a pair of pixel signals for focus detection in a first pupil dividing direction and the other becomes a pair of pixel signals for focus detection in a second pupil dividing direction.

In addition, when outputs of the photodiodes PD of four pixels are added up, that is, (a+b+c+d) in FIG. 3 is calculated, the pixel signals for focus detection become a pixel signal for image.

The vertical scanning section 21 is a circuit configured to sequentially select an array (a row) in the horizontal direction of the pixels of the pixel section 22 to perform scanning in the vertical direction. The vertical scanning section 21 selects a specific row and performs reset or transfer of the respective pixels present in the selected row. Consequently, a charge accumulation time period (an exposure time period) of the pixels is controlled.

The analog processing section 23 is a circuit configured to perform analog signal processing of an analog pixel signal read out from the pixel section 22. The analog processing section 23 includes, for example, a preamplifier configured to amplify a pixel signal and a correlated double sampling (CDS) circuit configured to reduce reset noise from the pixel signal.

The analog-digital conversion processing section (the ADC processing section) 24 converts the analog pixel signal outputted from the analog processing section 23 into a digital pixel signal. As the ADC processing section 24, a configuration for AD-converting, with an analog-digital converter (ADC) for each column, a pixel signal read out from the pixel section 22 represented by, for example, a column ADC is adopted.

The memory section 25 is configured by a volatile memory circuit or the like configured to temporarily retain the pixel signal converted by the ADC processing section 24.

The horizontal scanning section 26 reads out the pixel signals (the pixel signals for image and the pixel signals for focus detection) in column order from the memory section 25.

The output section 27 arrays the pixel signals read out by the horizontal scanning section 26 to generate a pixel signal row and converts the pixel signal row into an output signal form such as a serial signal or a differential signal and outputs the signal. Note that the output section 27, the ADC processing section 24 explained above, or the like also functions as a sensitivity increasing section configured to perform sensitivity increasing processing (signal amplification processing corresponding to set ISO sensitivity).

The input section 28 receives, from the system control section 14, a synchronization signal, a reference clock, information concerning operation setting, and the like related to control of the image pickup device 4.

The device control section 29 is configured by a processor or the like including hardware. The device control section 29 controls respective blocks in the image pickup device 4 according to the synchronization signal and the reference clock received through the input section 28. The device control section 29 includes a readout-method selecting section 30.

The readout-method selecting section 30 selects and sets, on the basis of the information concerning the operation setting (e.g., a camera mode such as still image photographing, moving image photographing, live view, or AF) received through the input section 28, readout from the image pickup device 4 (the first readout (the simple readout scheme), the second readout (the subtraction readout scheme), the third readout (the readout scheme without phase difference information), and the like explained above). The device control section 29 controls the respective sections in the image pickup device 4 according to the readout scheme set by the readout-method selecting section 30. In this way, a control section configured to control readout of the image pickup section is configured by the device control section 29 and the system control section 14 and the like shown in FIG. 1.

The control section controls the image pickup section (in the configuration example shown in FIG. 2, the image pickup device 4 corresponds to the image pickup section) to perform the first readout in a certain frame and perform the second readout in another certain frame. The control section controls the image pickup section to perform the third readout in yet another certain frame.

As explained above, the first readout means generating both of the pair of pixel signals for focus detection in the first pupil dividing direction on the basis of the photoelectric conversion signals and reading out the pair of pixel signals for focus detection.

The second readout means generating one of the pair of pixel signals for focus direction in the second pupil dividing direction on the basis of the photoelectric conversion signals, adding up all the photoelectric conversion signals generated in one pixel for image to generate the pixel signal for image, and reading out the generated one of the pixel signals for focus detection and the generated pixel signal for image.

Further, the third readout means adding up all the photoelectric conversion signals generated in one pixel for image to generate the pixel signal for image and reading out only the generated pixel signal for image.

FIG. 4 is a circuit diagram showing a configuration example of the pixel having the 4PD pixel structure.

In the pixel having the 4PD pixel structure, four photodiodes PD1 to PD4 are disposed in positions corresponding to one micro-lens L. More specifically, the four photodiodes PD1 to PD4 are respectively disposed in upper left, lower left, upper right, and lower right positions in a range in which an optical image of the micro-lens L is formed.

Transistors Tr1 to Tr4 functioning as switches are respectively connected to the four photodiodes PD1 to PD4. Control signals TX1 to TX4 are respectively applied to the transistors Tr1 to Tr4 from the vertical scanning section 21, whereby ON/OFF of the transistors Tr1 to Tr4 is respectively controlled.

The respective transistors Tr1 to Tr4 are connected to a floating diffusion FD. A signal charge of the photodiode PD corresponding to the turned-on transistor Tr is transferred to the floating diffusion FD.

One end of a transistor Tr5 functioning as a switch is connected between the respective transistors Tr1 to Tr4 and the floating diffusion FD. The other end of the transistor Tr5 is connected to a power supply voltage VDD. By applying a reset signal RES to the transistor Tr5, ON/OFF between the power supply voltage VDD side and the floating diffusion FD side is controlled. With such a configuration, reset of the floating diffusion FD is performed by turning on the transistor Tr5. Reset of the photodiode PD1 to PD4 is performed by further turning on the transistor Tr5 in a state in which the transistors Tr1 to Tr4 are on.

The floating diffusion FD is connected to an output terminal OUT through a transistor Tr6 functioning as a switch and a transistor Tr7 connected to the power supply voltage VDD and functioning as an amplifying section.

By applying a selection signal SEL to the transistor Tr6, a voltage value of the floating diffusion FD is amplified by the transistor Tr7 and read out from the output terminal OUT.

A timing chart (1) related to the first readout (the pixel for focus detection preferential mode) is explained with reference to FIGS. 5 and 6.

Figure 5:
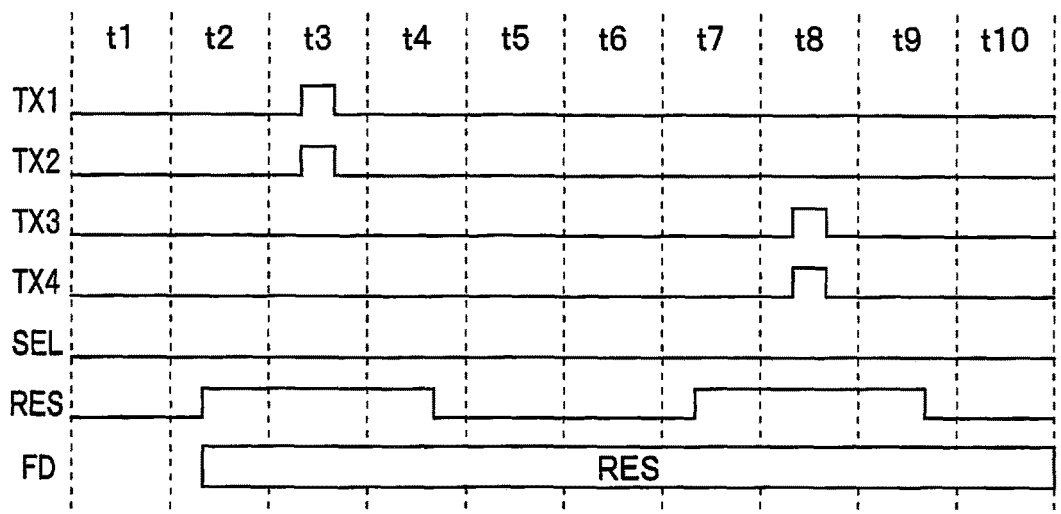
FIG. 5 is a timing chart showing a driving example of the image pickup device at the time when an electronic shutter operation in a pixel for focus detection preferential mode is performed in the first embodiment.

FIG. 5 is a timing chart showing a driving example of the image pickup device 4 at the time when an electronic shutter operation in the pixel for focus detection preferential mode is performed. Note that timings t1 to t10 in FIG. 5 (and FIGS. 6 to 11 referred to below) represent an anteroposterior relation of timings in one timing chart. Even if the same sign (e.g., t1) indicating timing is described in different timing charts, the sign does not represent the same time.

At the timing t2, when the reset signal RES is turned on (it is assumed that, among the transistors Tr1 to Tr6 functioning as the switches, the transistors other than the transistors clearly indicated as being on are off; the same applies below), the floating diffusion FD is reset. The reset signal RES is kept on until the reset signal RES is turned off at the timing t4.

At the timing t3, when the control signals TX1 and TX2 are turned on, because the reset signal RES is on at the point in time, signal charges of the photodiodes PD1 and PD2 are further reset.

After the reset signal RES is turned off at the timing t4, when the reset signal RES is turned on at the timing t7, the floating diffusion FD is reset again. The reset signal RES is kept on until the reset signal RES is turned off at the timing t9.

At the timing t8, when the control signals TX3 and TX4 are turned on, because the reset signal RES is on at the point in time, signal charges of the photodiodes PD3 and PD4 are further reset.

In a flow shown in FIG. 5, no charge transfer from the photodiodes PD1 to PD4 to the floating diffusion FD exists. Therefore, after the timing t2, the floating diffusion FD retains a reset charge (described as RES in the timing chart).

Figure 6:
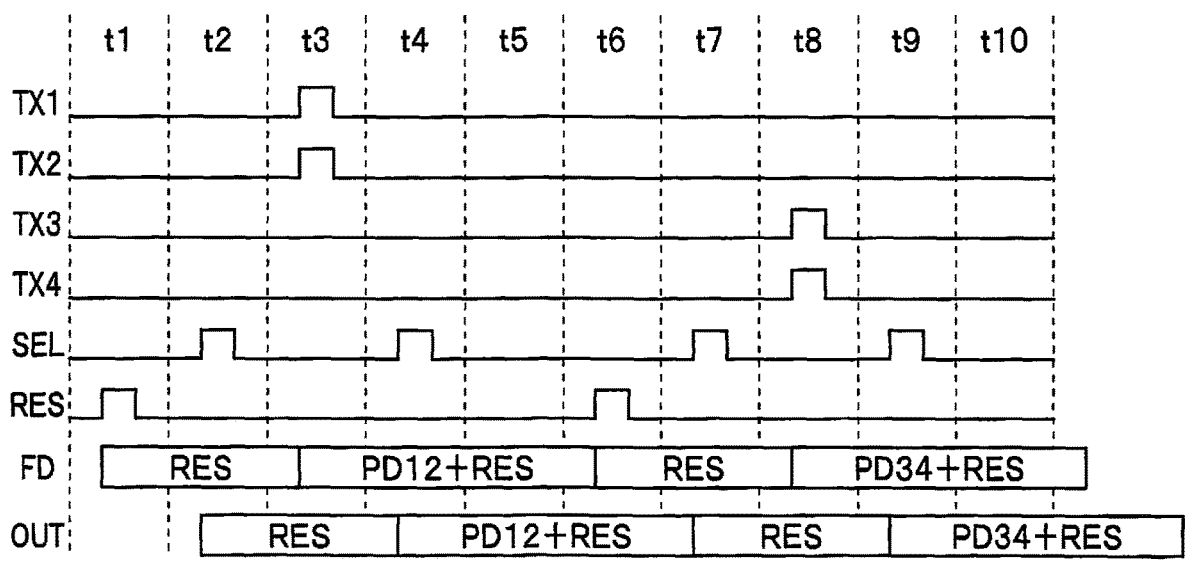
FIG. 6 is a timing chart showing a driving example of the image pickup device at the time when pixel signal readout in the pixel for focus detection preferential mode is performed in the first embodiment.

FIG. 6 is a timing chart showing a driving example of the image pickup device 4 at the time when pixel signal readout in the pixel for focus detection preferential mode is performed. A readout operation for a pixel signal performed after an exposure time period (corresponding to so-called shutter speed) elapses from the operation of the electronic shutter shown in FIG. 5 is shown in FIG. 6.

At the timing t1, when the reset signal RES is turned on, the floating diffusion FD is reset. The floating diffusion FD retains the reset charge (RES).

At the timing t2, when the selection signal SEL is turned on, a voltage of the reset charge (RES) accumulated in the floating diffusion FD is amplified by the transistor Tr7 and read out from the output terminal OUT.

At the timing t3, when the control signals TX1 and TX2 are turned on, a signal charge of the photodiode PD1 (the signal charge is represented as PD1) and a signal charge of the photodiode PD2 (the signal charge is represented as PD2) are transferred to the floating diffusion FD. Consequently, the floating diffusion FD retains a charge (PD12+RES (note that PD12=PD1+PD2)).

At the timing t4, when the selection signal SEL is turned on, a voltage of the charge (PD12+RES) accumulated in the floating diffusion FD is read out from the output terminal OUT. A reset voltage (reset noise) included in the voltage read out at the timing t4 is removed by the CDS circuit of the analog processing section 23 using the reset voltage read out at the timing t2 (thereafter, although explanation is omitted, reset noise is removed in the same manner).

Thereafter, at the timing t6, when the reset signal RES is turned on, the floating diffusion FD is reset. The floating diffusion FD retains the reset charge (RES).

At the timing t7, when the selection signal SEL is turned on, the voltage of the reset charge (RES) accumulated in the floating diffusion FD is read out from the output terminal OUT.

At the timing t8, when the control signals TX3 and TX4 are turned on, a signal charge of the photodiode PD3 (the signal charge is represented as PD3) and a signal charge of the photodiode PD4 (the signal charge is represented as PD4) are transferred to the floating diffusion FD. Consequently, the floating diffusion FD retains a charge (PD34+RES (note that PD34=PD3+PD4)).

At the timing t9, when the selection signal SEL is turned on, a voltage of the charge (PD34+RES) accumulated in the floating diffusion FD is read out from the output terminal OUT.

A timing chart (2) related to the second readout (the pixel for image preferential mode) is explained with reference to FIG. 7 or 8 and FIG. 9.

Figure 7:
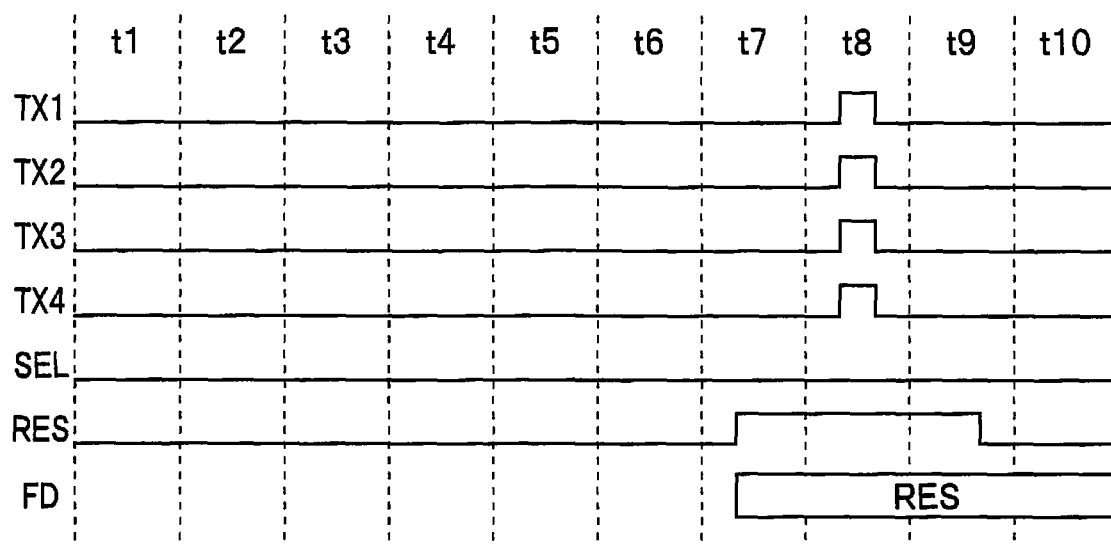
FIG. 7 is a timing chart showing a first example of driving of the image pickup device at the time when an electronic shutter operation in a pixel for image preferential mode is performed in the first embodiment.

FIG. 7 is a timing chart showing a first example of driving of the image pickup device 4 at the time when an electronic shutter operation in the pixel for image preferential mode is performed. In FIGS. 7 to 11, similarities to FIG. 5 or 6 are omitted as appropriate and briefly explained below.

At the timing t7, the reset signal RES is turned on. The turned-on reset signal RES is turned off at the timing t9. At the timing t8 when the reset signal RES is on, the control signals TX1 to TX4 are turned on and the signal charges of the photodiodes PD1 to PD4 are reset.

Figure 8:
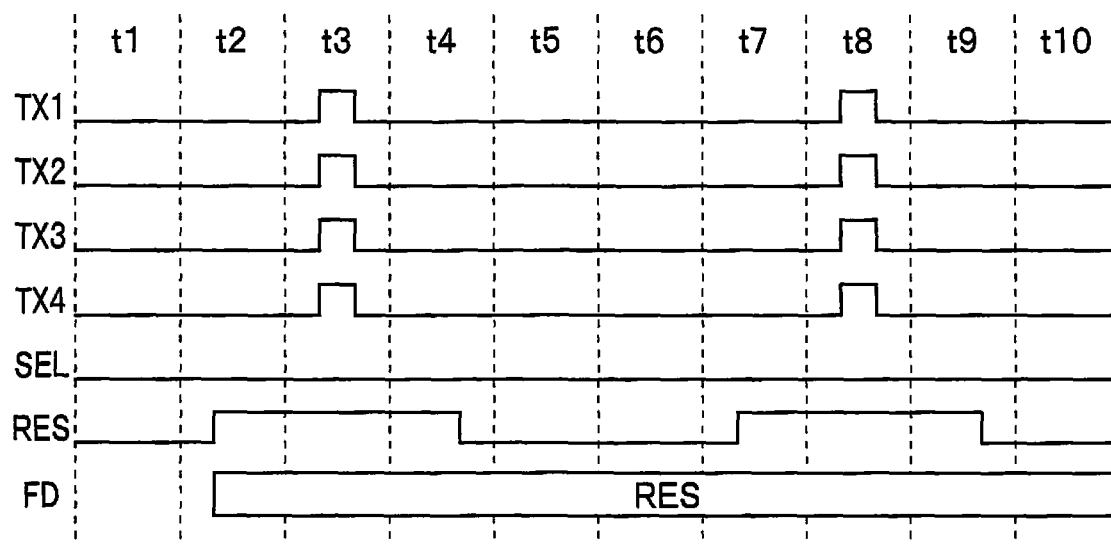
FIG. 8 is a timing chart showing a second example of the driving of the image pickup device at the time when the electronic shutter operation in the pixel for image preferential mode is performed in the first embodiment.

FIG. 8 is a timing chart showing a second example of the driving of the image pickup device 4 at the time when the electronic shutter operation in the pixel for image preferential mode is performed. As explained below with reference to FIG. 9, in pixel signal readout in the pixel for image preferential mode, readout of signal charges of the photodiodes PD1 and PD2 at the timing t3 and readout of signal charges of the photodiodes PD1 to PD4 at the timing t8 are performed. Therefore, fluctuation in the power supply voltage VDD is made constant (stationary) by performing reset of the photodiodes PD1 to PD4 in the electronic shutter operation twice at the timing t3 and the timing t8. This is the electronic shutter operation in FIG. 8.

That is, the reset signal RES is turned on at the timing 2. The turned-on reset signal RES is turned off at the timing t4. At the timing t3 when the reset signal RES is on, the control signals TX1 to TX4 are turned on and the signal charges of the photodiodes PD1 to PD4 are reset.

Further, the reset signal RES is turned on at the timing t7. The turned-on reset signal RES is turned off at the timing t9. At the timing t8 when the reset signal RES is on, the control signals TX1 to TX4 are turned on and the signal charges of the photodiodes PD1 to PD4 are reset.

Figure 9:
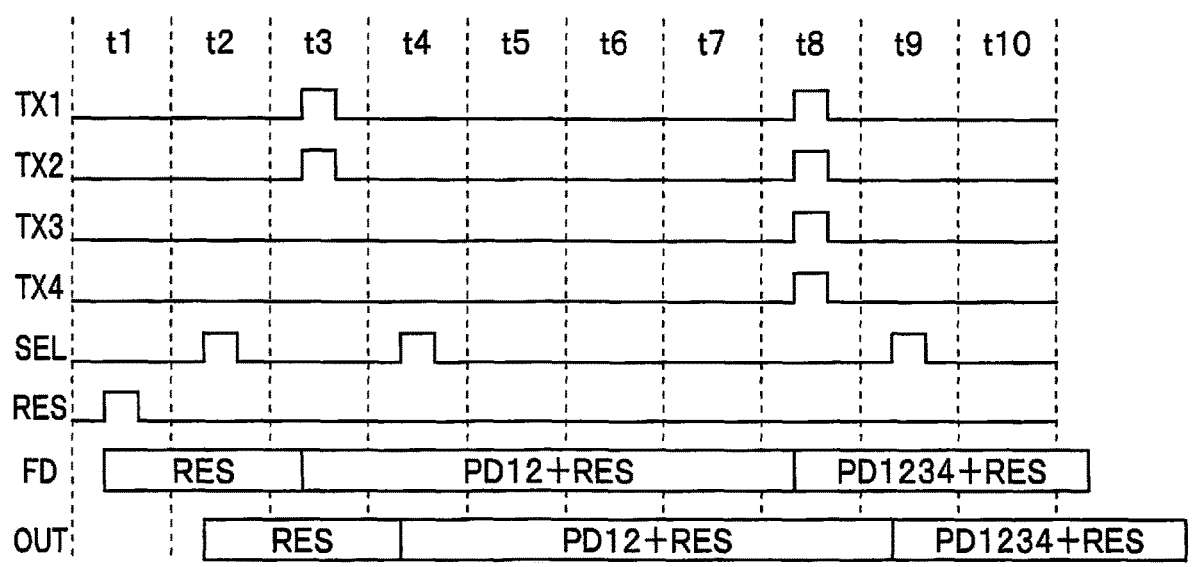
FIG. 9 is a timing chart showing a driving example of the image pickup device at the time when pixel signal readout in the pixel for image preferential mode is performed in the first embodiment.

FIG. 9 is a timing chart showing a driving example of the image pickup device 4 at the time when pixel signal readout in the pixel for image preferential mode is performed.

At the timing t1, the reset signal RES is turned on and the floating diffusion FD is reset. At the timing t2, a voltage of the reset charge (RES) is read out.

At the timing t3, signal charges of the photodiodes PD1 and PD2 are transferred to the floating diffusion FD. At the timing t4, a voltage of the charge (PD12+RES) is read out.

Thereafter, at the timing t8, signal charges of the photodiodes PD1 to PD4 are transferred to the floating diffusion FD. At the timing t9, a voltage of the charge (PD1234+RES (note that PD1234=PD1+PD2+PD3+PD4)) is read out.

Note that, when operation shown in FIG. 9 is performed, exposure time periods are different in the charge read out at the timing t3 and the charge read out at the timing t8. However, a difference between the exposure time periods is extremely small compared with an actual exposure time period (e.g., 1/30 second to 1/1000 second). Therefore, substantial influence may be considered to be generally absent.

Further, a timing chart (3) related to the third readout (the image only mode) is explained with reference to FIGS. 10 and 11.

Figure 10:
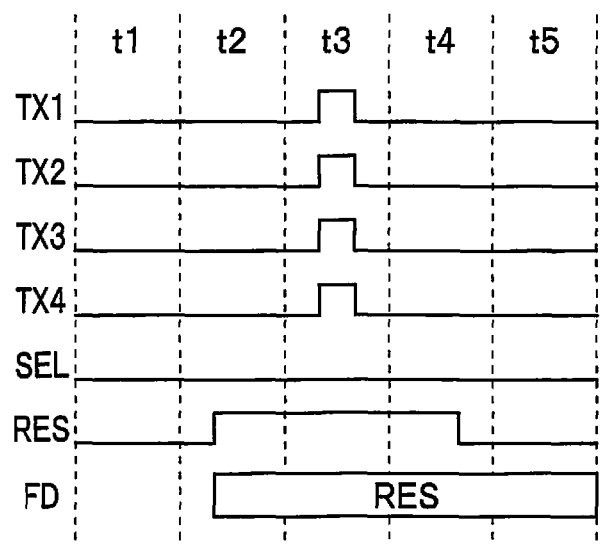
FIG. 10 is a timing chart showing a driving example of the image pickup device at the time when an electronic shutter operation in an image only mode is performed in the first embodiment.

FIG. 10 is a timing chart showing a driving example of the image pickup device 4 at the time when an electronic shutter operation in the image only mode is performed.

The reset signal RES is turned on at the timing t2. The turned-on reset signal RES is turned off at the timing t4. At the timing t3 when the reset signal RES is on, the control signals TX1 to TX4 are turned on and the signal charges of the photodiodes PD1 to PD4 are reset.

Figure 11:
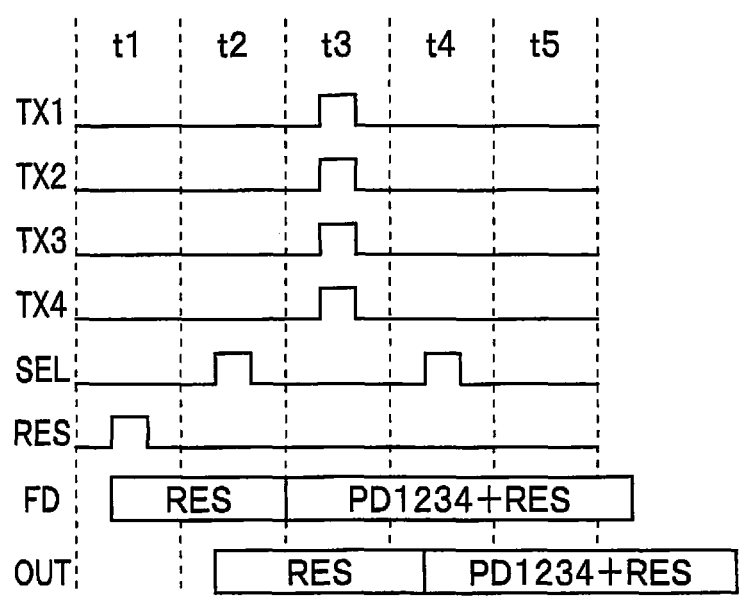
FIG. 11 is a timing chart showing a driving example of the image pickup device at the time when pixel signal readout in the image only mode is performed in the first embodiment.

FIG. 11 is a timing chart showing a driving example of the image pickup device 4 at the time when pixel signal readout in the image only mode is performed.

At the timing t1, the reset signal RES is turned on and the floating diffusion FD is reset. At the timing t2, a voltage of the reset charge (RES) is read out.

At the timing t3, signal charges of the photodiodes PD1 to PD4 are transferred to the floating diffusion FD. At the timing t4, a voltage of the charge (PD1234+RES) is read out.

In the image only mode (the third readout) for performing the electronic shutter operation shown in FIG. 10 and performing the pixel signal readout shown in FIG. 11, a pixel signal for image can be acquired but a pixel signal for focus detection cannot be acquired (however, readout only has to be performed once).

On the other hand, in the pixel for focus detection preferential mode (the first readout) for performing the electronic shutter operation shown in FIG. 5 and performing the pixel signal readout shown in FIG. 6 and the pixel for image preferential mode (the second readout) for performing the electronic shutter operation shown in FIG. 7 or 8 and performing the pixel signal readout shown in FIG. 9, by using the subtracting section for focus detection 7 or the adding section for image signal 9, both of the pixel signal for image and the pixel signals for focus detection can be acquired (however, readout needs to be performed twice).

Therefore, superiority and inferiority of noise and dynamic ranges with respect to the pixel signal for image and the pixel signals for focus detection in the pixel for focus detection preferential mode and the pixel for image preferential mode is explained.

First, in the pixel for focus detection preferential mode, noise of standard deviation indicated by the following Equation 1 and Equation 2 occurs with respect to the pixel signals for focus detection PD12 and PD34 to be read out.

$$\sigma_{PD12} = \sqrt{\sigma^2_{PD12\,light\;shot\;noise} + \sigma^2_{PD12\,dark\;current\;shot\;noise} + \sigma^2_{circuit\;noise}} \qquad [\text{Equation 1}]$$

$$\sigma_{PD34} = \sqrt{\sigma^2_{PD34\,light\;shot\;noise} + \sigma^2_{PD34\,dark\;current\;shot\;noise} + \sigma^2_{circuit\;noise}} \qquad [\text{Equation 2}]$$

The pixel signal for image PD1234 in the pixel for focus detection preferential mode is acquired by addition of PD12 and PD34 by the adding section for image signal 9. Therefore, a standard deviation of noise of the calculated pixel signal for image PD1234 is as indicated by the following Equation 3. Note that a calculated standard deviation σ of noise is attached with a prime and represented as σ' (the same applies below).

$$\sigma'_{PD1234} = \sqrt{\sigma^2_{PD12} + \sigma^2_{PD34}} \qquad [\text{Equation 3}]$$
$$= \sqrt{\sigma'^2_{PD1234\,light\;shot\;noise} + \sigma'^2_{PD1234\,dark\;current\;shot\;noise} + 2 \times \sigma^2_{circuit\;noise}}$$

Respective amounts shown in Equation 3 are as indicated by the following Equation 4.

$$\begin{cases} \sigma'^2_{PD1234\,light\;shot\;noise} = \\ \quad \sigma^2_{PD12\,light\;shot\;noise} + \sigma^2_{PD34\,light\;shot\;noise} \\ \sigma'^2_{PD1234\,dark\;current\;shot\;noise} = \\ \quad \sigma^2_{PD12\,dark\;current\;shot\;noise} + \sigma^2_{PD34\,dark\;current\;shot\;noise} \end{cases} \qquad [\text{Equation 4}]$$

On the other hand, in the pixel for image preferential mode, the pixel signal for image PD1234 is outputted from the image pickup device 4. Therefore, a standard deviation of noise of the pixel signal for image PD1234 is as indicated by the following Equation 5.

$$\sigma_{PD1234} = \sqrt{\sigma^2_{PD1234\,light\ shot\ noise} + \sigma^2_{PD1234\,dark\ current\ shot\ noise} + \sigma^2_{circuit\ noise}} \quad \text{[Equation 5]}$$

Therefore, as it is seen when a right side of Equation 3 and a right side of Equation 5 are compared (and, because the standard deviation σ and the standard deviation σ' may be considered to be a substantially equal level), an amount of noise included in the pixel signal for image PD1234 is smaller in the pixel for image preferential mode than in the pixel for focus detection preferential mode. The pixel for image preferential mode is superior from the viewpoint of noise (the viewpoint of an S/N).

On the other hand, in the pixel for focus detection preferential mode, the pixel signals for focus detection PD12 and PD34 are outputted from the image pickup device 4. Therefore, a standard deviation of noise of the pixel signals for focus detection PD12 and PD34 are as indicated by Equation 1 and Equation 2 described above.

On the other hand, the pixel signal for focus detection PD34 in the pixel for image preferential mode is acquired by subtracting the pixel signals for focus detection PD12 from the pixel signals for image PD 1234 by the adding section for image signal 9. Therefore, a calculated standard deviation of noise of the pixel signals for focus detection PD34 is as indicated by the following Equation 6.

$$\sigma'_{PD34} = \sqrt{\sigma^2_{PD12} + \sigma^2_{PD1234}} \quad \text{[Equation 6]}$$

$$= (\sigma^2_{PD12\,light\ shot\ noise} + \sigma^2_{PD12\,dark\ current\ shot\ noise} + \sigma^2_{PD1234\,light\ shot\ noise} + \sigma^2_{PD1234\,dark\ current\ shot\ noise} + 2 \times \sigma^2_{circuit\ noise})^{\frac{1}{2}}$$

Therefore, as it is seen when a right side of Equation 2 and a right side of Equation 6 are compared, an amount of noise included in the pixel signals for focus detection PD34 is smaller in the pixel for focus detection preferential mode than in the pixel for image preferential mode. The pixel for focus detection preferential mode is superior from the viewpoint of noise (the viewpoint of an S/N).

Figure 12:
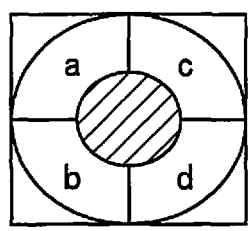
FIG. 12 is a diagram showing a state of light irradiated on the pixel having the 4PD pixel structure located in a center of a pixel section in the first embodiment.
Figure 13:
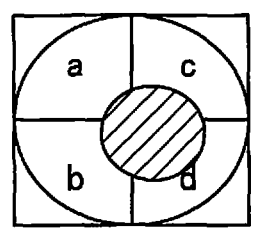
FIG. 13 is a diagram showing a state of light irradiated on the pixel having the 4PD pixel structure located in a peripheral section of the pixel section in the first embodiment.

FIG. 12 is a diagram showing a state of light irradiated on the pixel having the 4PD pixel structure located in a center of the pixel section 22. FIG. 13 is a diagram showing a state of light irradiated on the pixel having the 4PD pixel structure located in a peripheral portion of the pixel section 22. Note that hatching portions in FIGS. 12 and 13 indicate examples of portions on which light is irradiated.

In the case of a general photographing optical system, the center portion of the pixel section 22 is a portion orthogonal to and crossing an optical axis of the image pickup lens 2. A light beam is circularly condensed by the image pickup lens 2 and the micro-lens L. As shown in FIG. 12, lights are equally distributed to four photodiodes PD (a, b, c, and d).

On the other hand, light from the image pickup lens 2 is obliquely made incident on the peripheral portion of the pixel section 22. As shown in FIG. 13, the light beam is sometimes condensed in a shape different from the circle (the shape depends on an optical characteristic of the image pickup lens 2 and an optical characteristic of the micro-lens L). At this time, lights distributed to the four photodiodes PD (a, b, c, and d) are sometimes not equal.

More specifically, in an example shown in FIG. 13, light amounts distributed to four photodiodes are d>(b, c)>a. Therefore, when strong light is made incident, charges accumulated in the pixel for focus detection d are saturated and overflow.

Therefore, in the image pickup device 4, a structure (a structure based on a publicly-known technique) is adopted in which potential barriers partitioning a plurality of pixels for focus detection in one pixel for image are set lower than potential bathers partitioning a plurality of pixels for image to move charges overflowing in a certain pixel for focus detection in one pixel for image to other pixels for focus detection in the same pixel for image. Consequently, it is possible to prevent charge overflow from a pixel for image and reduce a decrease in a pixel value in a peripheral portion of an image.

A dynamic range of a pixel signal for display/recording acquired by the image pickup device 4 having such a configuration is explained with reference to FIGS. 14 and 15.

Figure 14:
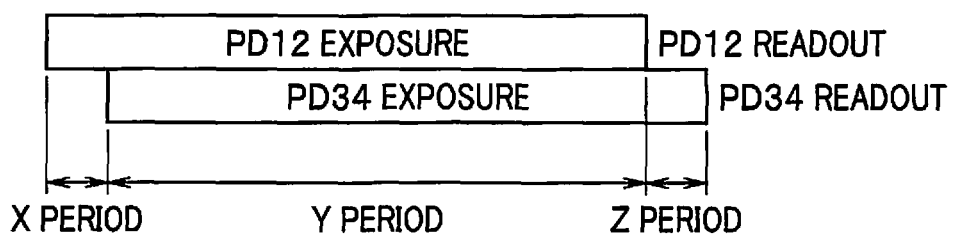
FIG. 14 is a timing chart for explaining a dynamic range of a pixel signal for display/recording acquired in the pixel for focus detection preferential mode in the first embodiment.

FIG. 14 is a timing chart for explaining a dynamic range of a pixel signal for display/recording acquired in the pixel for focus detection preferential mode.

In the pixel for focus detection preferential mode for performing the electronic shutter operation shown in FIG. 5 and performing the pixel signal readout shown in FIG. 6, deviation of start timing and deviation of end timing occur in exposure periods of the photodiodes PD1 and PD2 and exposure periods of the photodiodes PD3 and PD4.

An X period shown in FIG. 14 is a period indicating deviation between the timing t3 and the timing t8 shown in FIG. 5. A Y period shown in FIG. 14 is a common exposure period. A Z period shown in FIG. 14 is a period indicating deviation between the timing t3 and the timing t8 shown in FIG. 6.

Even if strong light is made incident in the X period and charges of the photodiodes PD1 and PD2 overflow to the photodiodes PD3 and PD4, the photodiodes PD3 and PD4 are reset at a point in time when the X period ends. Therefore, charges of the photodiodes PD3 and PD4 are lost.

Similarly, even if strong light is made incident in the Z period and charges of the photodiodes PD3 and PD4 overflow to the photodiodes PD1 and PD2, because charges of the photodiodes PD1 and PD2 are already read out at a point in time when the Y period ends, the charges do not contribute to an image of the same frame (further, because the photodiodes PD1 and PD2 are reset before exposure of a next frame is started, eventually, the charges are lost).

Therefore, in some case, luminance of an image is reduced by the loss of the charges and coloring occurs in an image (because charges of a specific color are lost).

Figure 15:
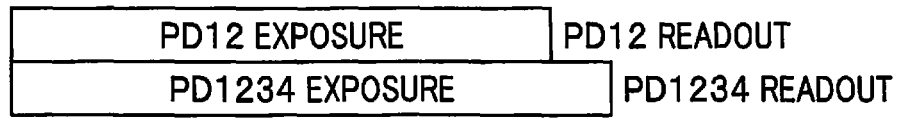
FIG. 15 is a timing chart for explaining a dynamic range of a pixel signal for display/recording acquired in the pixel for image preferential mode in the first embodiment.

FIG. 15 is a timing chart for explaining a dynamic range of a pixel signal for display/recording acquired in the pixel for image preferential mode.

As opposed to the pixel for focus detection preferential mode explained above, in the pixel for image preferential mode for performing the electronic shutter operation shown in FIG. 7 or 8 and performing the pixel signal readout shown in FIG. 9, exposure is started all at once at the timing t8 shown in FIG. 7 or 8 in all the photodiodes PD1 to PD4 in one pixel for image. Therefore, deviation does not occur in exposure start timing.

Exposure end timing of the pixel for image is the timing t8 shown in FIG. 9. Therefore, the loss of the charges in the pixel for focus detection preferential mode does not occur in the pixel for image.

Therefore, the pixel for image preferential mode is superior to the pixel for focus detection preferential mode from the viewpoint of the dynamic range of the pixel signal for display/recording.

A dynamic range of pixel signals for focus detection acquired by the image pickup device 4 is explained with reference to FIGS. 16 and 17.

For example, it is assumed that a pixel signal is subjected to sensitivity increase processing (which may be either analog signal amplification or digital signal amplification) by the ADC processing section 24, the output section 27, or the like explained above (according to ISO sensitivity set high), whereby an upper limit level of a digital value of a pixel signal for focus detection (which is a level of a digital clip (a maximum value of a digital signal) and is, for example, a value "4095" in a 12-bit signal) is lower than a level of saturation of the photodiode PD of a pixel for focus detection (a maximum amount of charges that can be accumulated in the photodiode PD).

Figure 16:
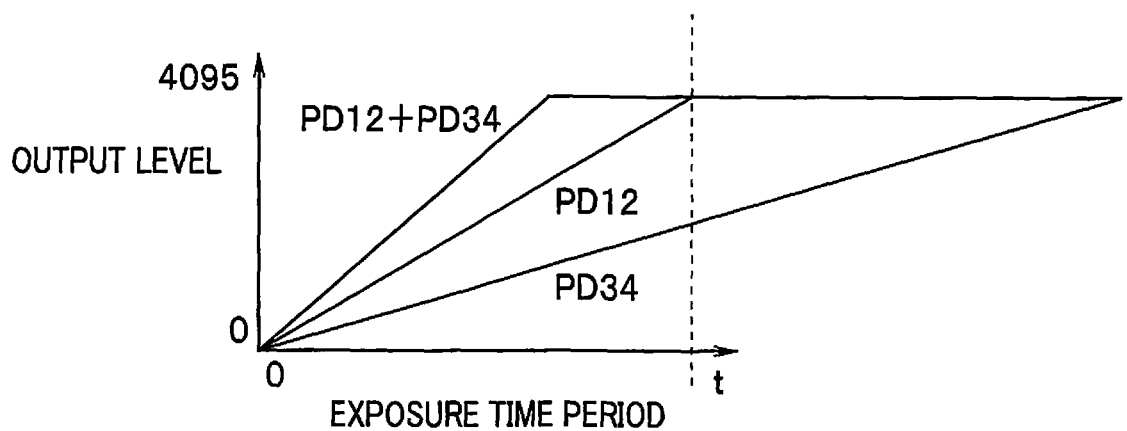
FIG. 16 is a timing chart for explaining a dynamic range of pixel signals for focus detection acquired in the pixel for focus detection preferential mode in the first embodiment.

First, FIG. 16 is a timing chart for explaining a dynamic range of pixel signals for focus detection acquired in the pixel for focus detection preferential mode.

If an amount of light made incident on a pixel per unit time period is constant, a pixel signal value monotonously increases according to an increase in an exposure time period t. In the pixel for focus detection preferential mode, for example, because the PD12 and the PD34 are outputted, the PD12 and the PD34 retain signal values corresponding to exposure amounts until either the PD12 or the PD34 is digitally clipped first (e.g., in the case of a 12-bit signal, until either the PD12 or the PD34 reaches a value of 4095 first (in an example shown in FIG. 16, because PD12>PD34, until the PD12 reaches the value of 4095)).

Figure 17:
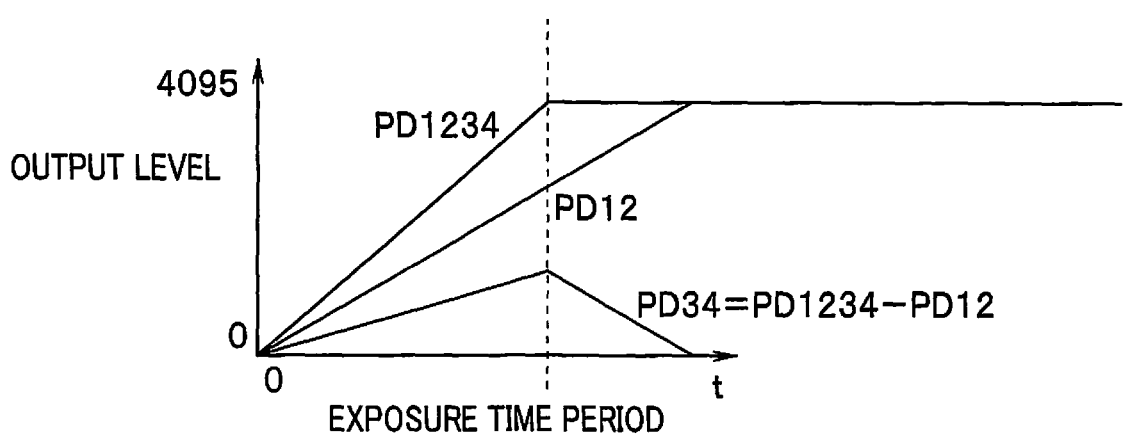
FIG. 17 is a timing chart for explaining a dynamic range of pixel signals for focus detection acquired in the pixel for image preferential mode in the first embodiment.

On the other hand, FIG. 17 is a timing chart for explaining a dynamic range of pixel signals for focus detection acquired in the pixel for image preferential mode.

In the pixel for image preferential mode, for example, the PD1234 and the PD12 are outputted. A relation of PD1234>PD12 exists in signal values. Therefore, the PD1234 can retain a signal value corresponding to an exposure amount only until the PD1234 is digitally clipped. When the PD1234 is digitally clipped, even if calculation of PD34=PD1234-PD12 is performed, as shown in FIG. 17, a correct signal value PD34 corresponding to an exposure amount cannot be obtained.

In general, even if the PD1234 is digitally clipped, the PD12 and the PD34 are considered to be not digitally clipped.

Therefore, the pixel for focus detection preferential mode is superior to the pixel for image preferential mode from the viewpoint of the dynamic range of the pixel signals for focus detection.

FIG. 18 is a table for explaining superiority and inferiority in S/Ns and dynamic ranges of pixel signals for display/recording and pixel signals for focus detection acquired in each of the pixel for focus detection preferential mode (a timing chart (1)), the pixel for image preferential mode (a timing chart (2)), and the image only mode (a timing chart (3)). In FIG. 18, excellent S/Ns and dynamic ranges are indicated by "◯", S/Ns and dynamic ranges inferior to the excellent S/Ns and dynamic ranges are indicated by "Δ", and S/Ns and dynamic ranges not applicable are indicated by "-".

As shown in FIG. 18, in both of the SN and the dynamic range (in FIG. 18, described as "D range"), concerning the pixel signal for focus detection, the pixel for focus detection preferential mode (the timing chart (1)) is superior to the pixel for image preferential mode (the timing chart (2)). Concerning the pixel signal for display/recording, the pixel for image preferential mode (the timing chart (2)) is superior to the pixel for focus detection preferential mode (the timing chart (1)). The image only mode (the timing chart (3)) is excellent concerning the pixel signal for display/recording. However, the pixel signal for focus detection is not acquired.

FIG. 19 is a table in which timing charts according to which the image pickup device 4 is driven are classified according to necessity/unnecessity of data for focus detection and according to which of the pixel for focus detection and the pixel for image is prioritized.

As explained above, the timing chart (1) related to the first readout indicates FIGS. 5 and 6. The timing chart (2) related to the second readout indicates FIG. 7 or 8 and FIG. 9. The timing chart (3) related to the third readout indicates FIGS. 10 and 11.

The control section (the device control section 29 and the system control section 14) controls the image pickup section (e.g., the image pickup device 4) to perform the third readout when the pixel signals for focus detection are unnecessary. When the pixel signals for focus detection are necessary, the control section performs control as explained below. That is, the control section controls the image pickup section to perform the first readout when the pixel signals for focus detection are prioritized over the pixel signal for image and controls the image pickup section to perform the second readout when the pixel signal for image is prioritized over the pixel signals for focus detection.

More specifically, as shown in FIG. 19, when data for focus detection (the pixel signals for focus detection) is unnecessary, for example, in still image photographing, the timing chart (3) (the image only mode) is selected.

When the data for focus detection (the pixel signals for focus detection) is necessary, a timing chart selected and used is different according to whether the pixel signals for focus detection are prioritized or the pixel signal for image is prioritized.

That is, when the pixel signals for focus detection are prioritized (e.g., when an image for display or recording is unnecessary and only the pixel signals for focus detection are necessary), the timing chart (1) (the pixel for focus detection preferential mode) is selected and used. Consequently, in the pixel for focus detection preferential mode, it does not occur that one of the pixel signals for focus detection cannot be restored because of the digital clip as explained with reference to FIG. 17. Pixel signals for focus detection having a wide dynamic range can be obtained.

When the pixel signal for image is prioritized (when the pixel signals for focus detection are necessary but quality of an image is prioritized, for example, as in live view or moving image photographing), the timing chart (2) (the pixel for image preferential mode) is selected and used. Consequently, in the pixel for image preferential mode, S/Ns of a display image and a recording image are high and a charge loss does not occur in the X period and the Z period. Therefore, an image in a wide dynamic range can be obtained.

A selecting method shown in FIG. 19 is applied in common when a camera mode is any of a still image photographing mode, a moving image photographing mode, a live view mode, and an AF mode.

Figure 20:
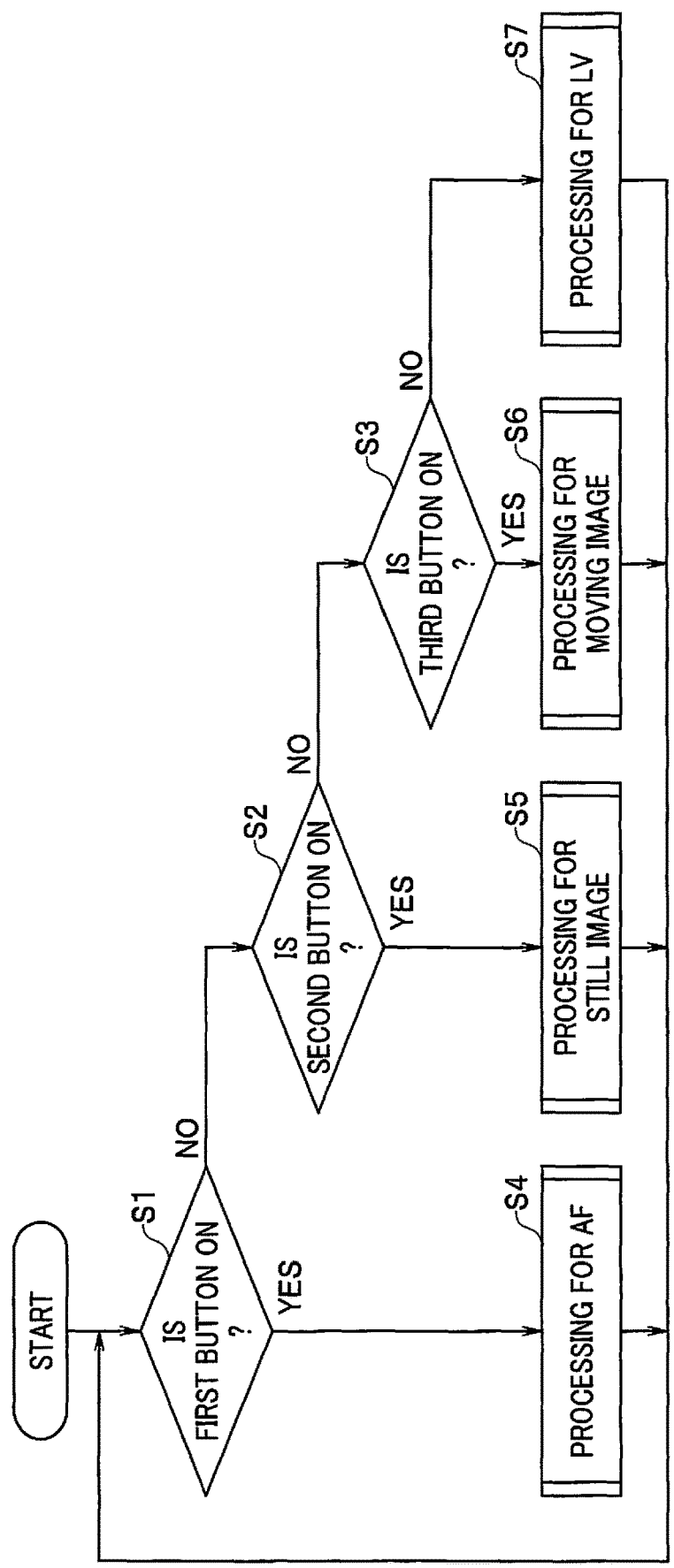
FIG. 20 is a flowchart showing action of the image pickup apparatus in the first embodiment.

FIG. 20 is a flowchart showing action of the image pickup apparatus 1. Respective operations shown in FIG. 20 and FIGS. 21 and 22 referred to below are performed by the image pickup apparatus 1 on the basis of the control by the system control section 14.

When the processing is started, the image pickup apparatus 1 determines whether the first button of the input IF 13 is on (step S1).

When determining that the first button is off, the image pickup apparatus 1 determines whether the second button of the input IF 13 is on (step S2).

Further, when determining that the second button is off, the image pickup apparatus 1 determines whether the third button of the input IF 13 is on (step S3).

When determining in step S1 that the first button is on, the image pickup apparatus 1 performs processing for AF explained below with reference to FIG. 21 (step S4).

When determining in step S2 that the second button is on, the image pickup apparatus 1 performs processing for still image explained with reference to FIG. 22 below (step S5).

Further, when determining in step S3 that the third button is on, the image pickup apparatus 1 performs processing for moving image substantially the same as the processing in FIG. 22 explained below (step S6).

On the other hand, when determining in step S3 that the third button is off, the image pickup apparatus 1 performs processing for live view (LV) substantially the same as the processing in FIG. 22 explained below except that recording processing is unnecessary (step S7).

After performing the processing in any one of steps S4 to S7, the image pickup apparatus 1 returns to the processing in step S1.

Figure 21:
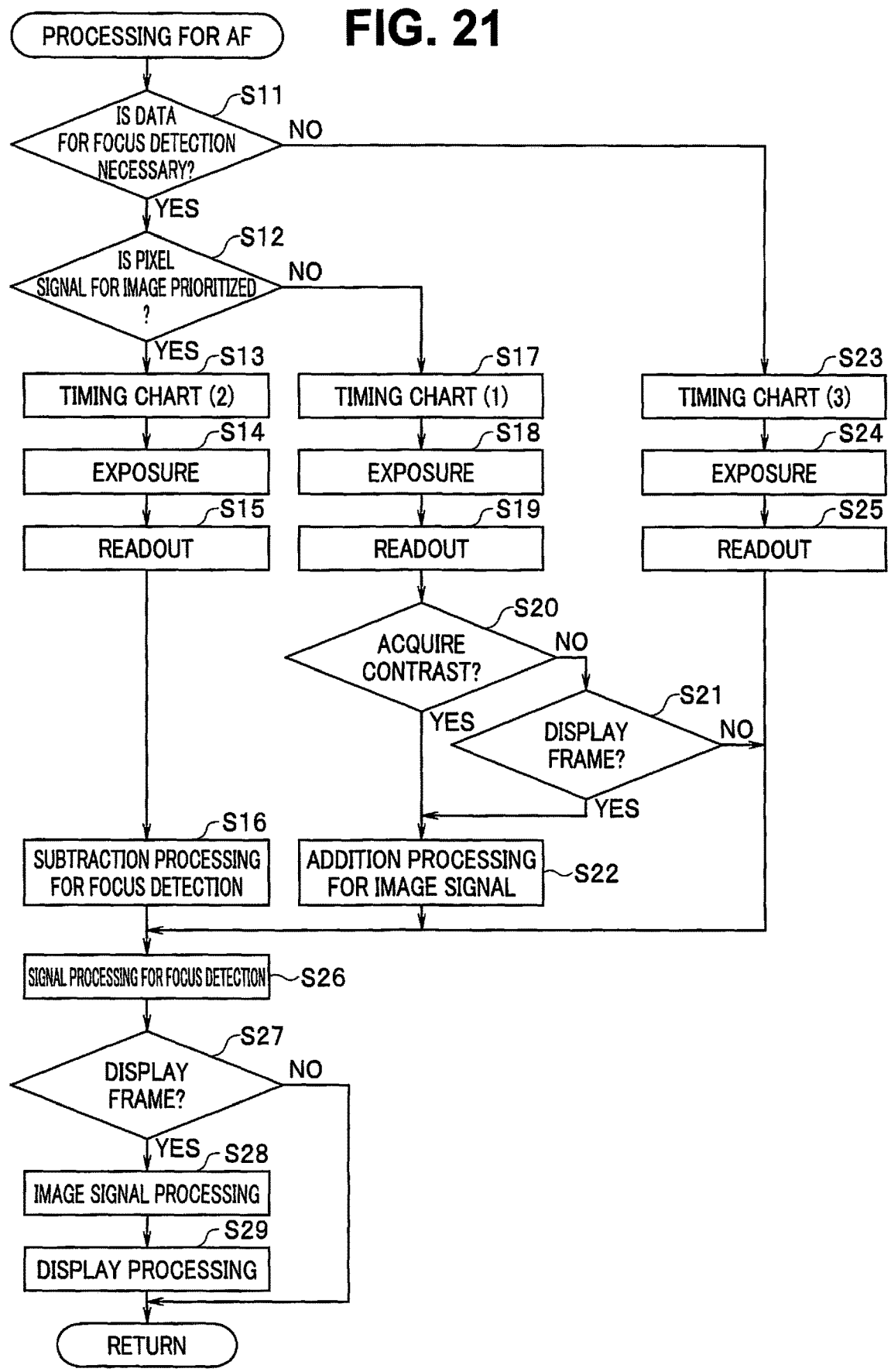
FIG. 21 is a flowchart showing content of processing for AF in step S4 in FIG. 20 in the first embodiment.

FIG. 21 is a flowchart showing content of the processing for AF in step S4 in FIG. 20.

When the processing is started, the image pickup apparatus 1 determines whether data for focus detection is necessary (step S11).

When determining that the data for focus detection is necessary, the image pickup apparatus 1 determines whether a pixel signal for image is prioritized or pixel signals for focus detection are prioritized (step S12).

When it is determined that the pixel signal for image is prioritized, the readout-method selecting section 30 of the device control section 29 selects and sets the operation of the timing chart (2) (the second readout) shown in FIG. 7 or 8 and FIG. 9 on the basis of a command from the system control section 14 (step S13).

The image pickup apparatus 1 performs exposure on the basis of the set timing chart (2) (step S14) and performs readout of pixel signals (step S15).

As explained above, the pixel signals to be read out are, for example, PD1234 and PD12. Therefore, the subtraction processing for focus detection of PD34=PD1234-PD12 is performed by the subtracting section for focus detection 7 (step S16).

When it is determined in step S12 that the pixel signals for focus detection are prioritized, the readout-method selecting section 30 of the device control section 29 selects and sets the operation of the timing chart (1) (the first readout) shown in FIGS. 5 and 6 on the basis of a command from the system control section 14 (step S17).

The image pickup apparatus 1 performs exposure on the basis of the set timing chart (1) (step S18) and performs readout of pixel signals (step S19).

For example, besides phase difference AF, contrast AF is sometimes further performed. Therefore, the image pickup apparatus 1 determines whether to acquire contrast (step S20).

When determining not to acquire contrast, the image pickup apparatus 1 further determines whether to display a frame image (step S21).

When determining in step S20 to acquire contrast or when determining in step S21 to display a frame image, because a pixel signal for image is necessary, the image pickup apparatus 1 performs the addition processing for image signals (step S22). That is, as explained above, the pixel signals to be read out are, for example, PD12 and PD34. Therefore, the image pickup apparatus 1 performs the addition processing of PD1234=PD12+PD34 with the adding section for image signal 9.

On the other hand, when determining in step S11 that the data for focus detection is unnecessary, the readout-method selecting section 30 of the device control section 29 selects and sets the operation of the timing chart (3) (the third readout) shown in FIGS. 10 and 11 on the basis of a command from the system control section 14 (step S23).

The image pickup apparatus 1 performs exposure on the basis of the set timing chart (3) (step S24) and performs readout of pixel signals (step S25).

When any one of the processing in step S16, the processing in step S22, and the processing in step S25 is performed or when it is determined in step S21 not to display a frame image, the signal processing section for focus detection 8 performs phase difference AF detection on the basis of pixel signals for focus detection (e.g., PD12 and PD34) or calculates contrast on the basis of a pixel signal for image (e.g., PD1234) and performs contrast AF detection (step S26).

Subsequently, the image pickup apparatus 1 determines whether to display a frame image (step S27).

When it is determined to display a frame image, the image-signal processing section 10 performs image signal processing (step S28) on the basis of the pixel signal for image (e.g., PD1234) (step S28) and performs processing for displaying an image on the display section 11 (step S29).

After step S29 is performed or when determining in step S27 not to display a frame image, the image pickup apparatus 1 returns from the processing to the processing shown in FIG. 20.

Figure 22:
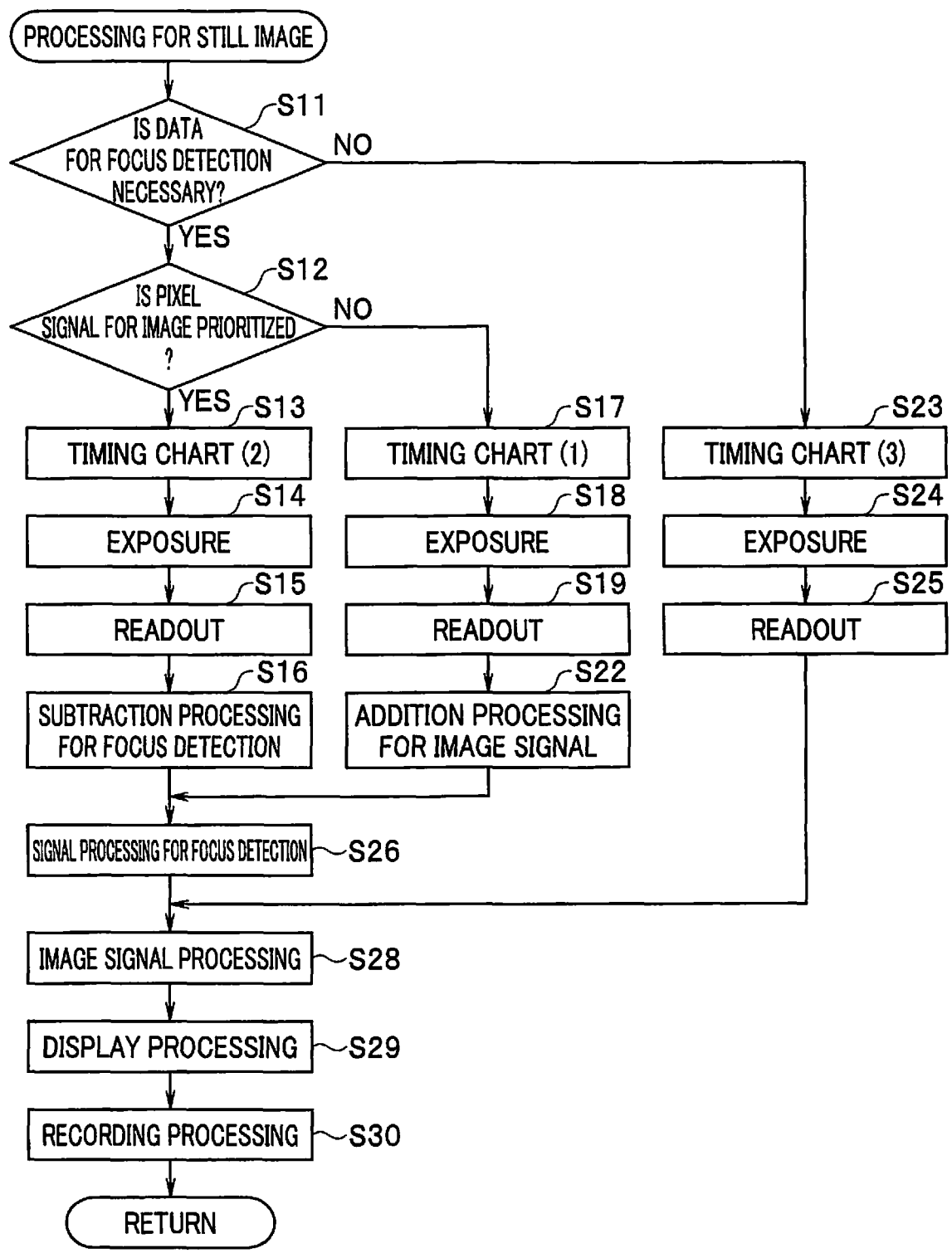
FIG. 22 is a flowchart showing content of processing for a still image in step S5 in FIG. 20 in the first embodiment.

FIG. 22 is a flowchart showing content of the processing for still image in step S5 in FIG. 20.

In the processing for still image, as in the processing for AF explained above, when determining in step S11 that the data for focus detection is unnecessary, the image pickup apparatus 1 performs the processing in steps S23 to S25, when determining in step S12 that the pixel signal for image is prioritized, the image pickup apparatus 1 performs the processing in steps S13 to S16, and, when determining in step S12 that the pixel signals for focus detection are prioritized, the image pickup apparatus 1 performs the processing in steps S17 to S19.

However, in the processing for still image, because a pixel signal for image is necessary, the image pickup apparatus 1 performs the addition processing for image signals in step S22 from the pixel signals read out in step S19 without performing the determination in step S20 and step S21.

After performing the processing in step S16 or step S22, the image pickup apparatus 1 performs the signal processing for focus detection in step S26 and then proceeds to the processing in step S28. After performing the processing in step S25, the image pickup apparatus 1 skips the processing in step S26 and proceeds to the processing in step S28.

Because the processing for AF is performed in FIG. 21, even if pixel signals for focus detection are unnecessary, after performing the processing in step S25, the image pickup apparatus 1 proceeds to step S26 and performs the contrast AF. On the other hand, because the processing for still image is performed in FIG. 22, the image pickup apparatus 1 skips the signal processing for focus detection in step S26.

Thereafter, after performing the image signal processing in step S28, in step S29, the image pickup apparatus 1 performs processing for displaying an image on the display section 11. Further, the image pickup apparatus 1 performs processing for recording the image in the recording section 12 (step S30). After performing the processing in step S30, the image pickup apparatus 1 returns from the processing to the processing shown in FIG. 20.

Note that, in the processing for moving image in step S6 in FIG. 20, processing substantially the same as the processing for still image shown in FIG. 22 is performed, for example, in frame unit. In the processing for LV in step S7 in FIG. 20, similarly, processing substantially the same as the processing for still image shown in FIG. 22 is performed in frame unit. However, because recording of an image is unnecessary in the live view, step S30 is skipped.

Figure 23:
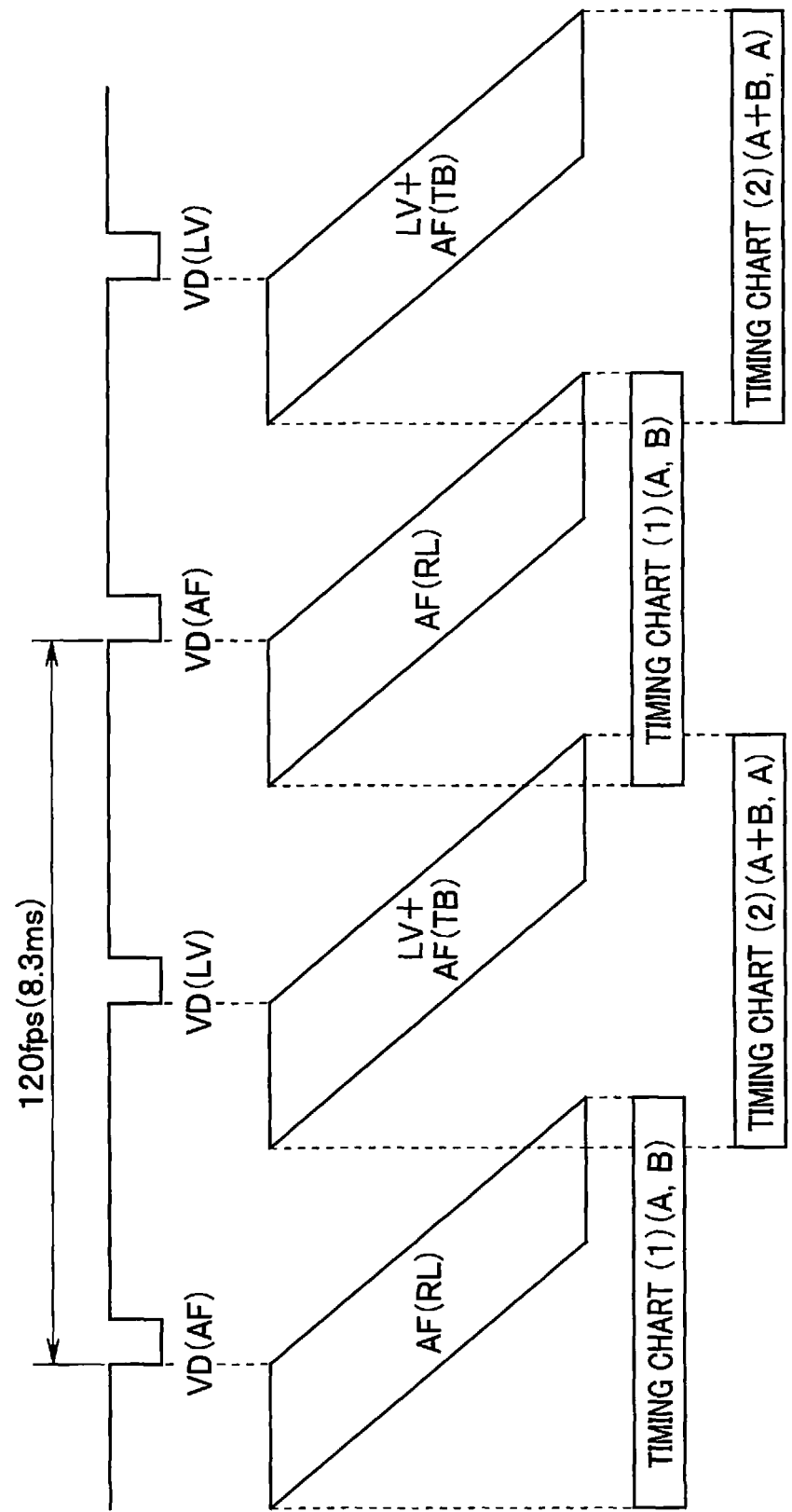
FIG. 23 is a timing chart showing an example in which operation of the image pickup device by the pixel for focus detection preferential mode and operation of the image pickup device by the pixel for image preferential mode are alternately performed for each one frame in the first embodiment.

FIG. 23 is a timing chart showing an example in which operation of the image pickup device 4 by the pixel for focus detection preferential mode and operation of the image pickup device 4 by the pixel for image preferential mode are alternately performed for each one frame.

In actual operation of the image pickup apparatus 1, autofocusing is performed even while the live view is performed. FIG. 23 shows such a practical operation example of the image pickup device 4.

When operation of a so-called rolling shutter is performed, readout of a pixel signal in a first row is performed in synchronization with a vertical synchronization signal VD. Thereafter, readout is sequentially performed for each row (or may be performed for each plurality of rows). Concerning any row, the electronic shutter operation is performed at a point in time retroactive by an exposure time period from a readout point in time.

For example, when a live view image is acquired at a frame rate of 120 fps (i.e., a time interval of 8.3 ms), the vertical synchronization signal VD is set to 240 fps (i.e., a time interval of 4.2 ms). Readout of a live view image and readout of a pixel signal for focus detection are alternately performed in synchronization with the vertical synchronization signal VD.

More specifically, in synchronization with a certain vertical synchronization signal VD, according to the timing chart (1) shown in FIG. 6, a pair of pixel signals for focus detection (e.g., PD12 and PD34) for performing phase difference detection (vertical line detection) in the horizontal direction is read out (in FIG. 23, described as RL (right and left)). At this time, the electronic shutter operation is performed according to the timing chart (1) shown in FIG. 5 at a point in time retroactive by an exposure time period from the readout.

Subsequently, in synchronization with a next vertical synchronization signal VD, one (e.g., PD13) of a pair of pixel signals for focus detection for performing phase difference detection (horizontal line detection) in the vertical direction and a pixel signal for image (e.g., PD1234) are read out (in FIG. 23, described as TB (top and bottom)) according to the timing chart (2) corresponding to FIG. 9 (the control signals TX1 and TX3 are turned on instead of turning on the control signals TX1 and TX2 at timing t3 in FIG. 9). At this time, the electronic shutter operation is performed according to the timing chart (2) shown in FIG. 7 or 8 at a point in time retroactive by an exposure time period from the readout. Further, thereafter, the image pickup apparatus 1 performs the subtraction processing for focus detection of PD24=PD1234−PD13 with the subtracting section for focus detection 7 and restores the other PD24 of the pair of pixel signals for focus detection necessary for the horizontal line detection.

Thereafter, similarly, the image pickup apparatus 1 alternately performs readout of both of a pair of pixel signals for focus detection for performing phase difference detection in the horizontal direction and readout of one of a pair of pixel signals for focus detection for performing phase difference detection in the vertical direction and a pixel signal for image.

Note that, instead of the processing explained above, the image pickup apparatus 1 may alternately perform readout of both of a pair of pixel signals for focus detection for performing phase difference detection in the vertical direction and readout of one of a pair of pixel signals for focus detection for performing phase difference detection in the horizontal direction and a pixel signal for image.

In this way, the system control section 14 and the device control section 29, which are the control sections, control the image pickup section to alternately perform the first readout and the second readout for each one frame. Further, in an example shown in FIG. 23, the first pupil dividing direction in the first readout and the second pupil dividing direction in the second readout are different directions (the first pupil dividing direction and the second pupil dividing direction may be the same direction). Note that, to obtain pixel signals for focus detection in the different pupil dividing directions, the pixel for image needs to be divided into three or more (desirably, four or more) pixels for focus detection.

Four or more kinds of pixel signals for focus detection may be divided into two or more frames and outputted. As an example, with four frames set as a basic cycle, a pixel for image and one of a pair of pixels for focus detection in a direction from upper left to lower right are read out in a first frame, a pair of pixels for focus detection in the horizontal direction is read out in a second frame, a pixel for image and one of a pair of pixels for focus detection in a direction of lower left to upper right are read out in a third frame, and a pair of pixels for focus detection in the horizontal direction is read out in a fourth frame. At this time as well, readout is performed according to the timing chart (2) in a frame in which a pixel signal for image is prioritized and readout is performed according to the timing chart (1) in a frame in which pixel signals for focus detection are prioritized.

By performing the processing shown in FIG. 23 explained above, the focus detection can be performed while the live view is performed. Further, both of the vertical line detection and the horizontal line detection can be performed (or detection in different directions can be further performed). Therefore, accuracy of the focus detection can be improved.

Note that, in the above explanation, the right-left division and the up-down division (up-down and right-left division into four in which both of the right-left division and the up-down direction are possible) and the like are mainly illustrated as a method of dividing the pixel for image into the pixel signals for focus detection. However, the pixel for image may be divided in oblique directions. The number of divisions may be larger than four (the number of divisions may be two to four as explained above). The method of the division and the number of divisions are not limited to the examples explained above.

When a pixel signal generated by the photodiode PD is RAW-recorded, the proper use of the timing charts (1) to (3) explained above can be applied in the same manner.

According to such a first embodiment, the first readout for generating and reading out both of a pair of pixel signals for focus detection is performed in a certain frame and the second readout for generating and reading out one of a pair of pixel signals for focus detection and a pixel signal for image is performed in another certain frame. Therefore, by performing the first readout, a pixel signal for focus detection having a high S/N and a wide dynamic range can be obtained. By performing the second readout, a pixel signal for image having a high S/N and a wide dynamic range can be obtained. The first readout and the second readout can be properly used according to a use.

The first readout is performed when pixel signals for focus detection are prioritized and the second readout is performed when the pixel signal for image is prioritized. Consequently, a pixel signal for image having high image quality and a pixel signal for focus detection having high image quality can be appropriately obtained according to a use.

Further, by performing the third readout for reading out only a pixel signal for image, only a pixel signal for image having high image quality can be obtained. By performing the third readout when pixel signals for focus detection are unnecessary, a load and power consumption of the image pickup apparatus can be reduced and a readout time period can be reduced. In the first readout and the second readout, readout is performed twice for one pixel for image. On the other hand, in the third readout, readout only has to be performed once for one pixel for image. Therefore, curtain speed of a so-called rolling shutter can be increased. Consequently, distortion of an object moving at high speed can be reduced. A higher-quality frame image can be obtained.

For example, as shown in FIG. 23, the control section can alternately obtain a pixel signal for focus detection having high image quality and a pixel signal for image having high image quality by alternately performing the first readout and the second readout for each one frame. Consequently, it is possible to perform both of acquisition of a frame image having high image quality and highly accurate phase difference detection, for example, in moving image photographing or live view. At this time, by setting the first pupil dividing direction in the first readout and the second pupil dividing direction in the second readout to different directions, phase differences in a plurality of different directions can be detected. The accuracy of focus detection can be further improved.

In addition, when the first readout is performed, by adding up both of a pair of pixel signals for focus detection to generate a pixel signal for image, a pixel signal for image having a certain degree of image quality can also be obtained in addition to a pixel signal for focus detection having high image quality.

On the other hand, when the second readout is performed, by subtracting one of a pair of pixel signals for focus detection from a pixel signal for image to generate the other of the pair of pixel signals for focus detection, a pixel signal for focus detection having a certain degree of image quality can also be obtained in addition to a pixel signal for image having high image quality.

Note that that the processing of the respective sections explained above may be performed by one or more processors configured as hardware. For example, the respective sections may be respectively processors configured as electronic circuits or may be respective circuits sections in a processor configured by an integrated circuit such as an FPGA (field programmable gate array). Alternatively, a processor configured by one or more CPUs may read and execute a processing program recorded in a recording medium to thereby execute functions of the respective sections.

The image pickup apparatus is mainly explained above. However, the present invention may be a control method for controlling the image pickup apparatus as explained above or may be a processing program for causing a computer to perform the same processing as the processing of the image pickup apparatus, a computer-readable non-transitory recording medium in which the processing program is recorded, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals; and
a processor including hardware, wherein
the processor controls the image pickup section to perform, in a frame, first readout for generating both of a pair of the pixel signals for focus detection in a first pupil dividing direction on the basis of the photoelectric conversion signals and reading out the pair of pixel signals for focus detection and perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, reading out the generated one of a pair of pixel signals for focus detection and reading out the pixel signal for image.

2. The image pickup apparatus according to claim 1, wherein the processor controls the image pickup section to perform the first readout when the pixel signals for focus detection are prioritized over the pixel signal for image and controls the image pickup section to perform the second readout when the pixel signal for image is prioritized over the pixel signals for focus detection.

3. The image pickup apparatus according to claim 1, wherein the processor controls the image pickup section to perform, in yet another frame, third readout for adding up all the photoelectric conversion signals generated in the one pixel for image to generate the pixel signal for image and reading out only the generated pixel signal for image.

4. The image pickup apparatus according to claim 3, wherein the processor controls the image pickup section to perform the third readout when the pixel signals for focus detection are unnecessary.

5. The image pickup apparatus according to claim 1, wherein the processor controls the image pickup section to alternately perform the first readout and the second readout for each one frame.

6. The image pickup apparatus according to claim 5, wherein
the pixel for image is divided into three or more of the pixels for focus detection, and
the first pupil dividing direction and the second pupil dividing direction are different directions.

7. The image pickup apparatus according to claim 1, further comprising a second processor configured to add up both of the pair of pixel signals for focus detection to generate the pixel signal for image when the first readout is performed.

8. The image pickup apparatus according to claim 1, further comprising a third processor configured to subtract one of the pair of pixel signals for focus detection from the pixel signal for image to generate another of the pair of pixel signals for focus detection when the second readout is performed.

9. A control method for an image pickup apparatus including an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals,
the control method comprising controlling the image pickup section to
perform, in a frame, first readout for generating both of a pair of the pixel signals for focus detection in a first pupil dividing direction on the basis of the photoelectric conversion signals and reading out the pair of pixel signals for focus detection and
perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, reading out the generated one of the pair of pixel signals for focus detection and reading out the pixel signal for image.

10. The control method for the image pickup apparatus according to claim 9, further comprising controlling the image pickup section to perform the first readout when the pixel signals for focus detection are prioritized over the pixel signal for image and controlling the image pickup section to perform the second readout when the pixel signal for image is prioritized over the pixel signals for focus detection.

11. The control method for the image pickup apparatus according to claim 9, further comprising controlling the image pickup section to perform, in yet another frame, third readout for adding up all the photoelectric conversion signals generated in the one pixel for image to generate the pixel signal for image and reading out only the generated pixel signal for image.

12. The control method for the image pickup apparatus according to claim 11, further comprising controlling the image pickup section to perform the third readout when the pixel signals for focus detection are unnecessary.

13. The control method for the image pickup apparatus according to claim 9, further comprising controlling the image pickup section to alternately perform the first readout and the second readout for each one frame.

14. The control method for the image pickup apparatus according to claim 13, wherein
the pixel for image is divided into three or more of the pixels for focus detection, and
the first pupil dividing direction and the second pupil dividing direction are different directions.

15. The control method for the image pickup apparatus according to claim 9, further comprising adding up both of the pair of pixel signals for focus detection to generate the pixel signal for image when the first readout is performed.

16. The control method for the image pickup apparatus according to claim 9, further comprising subtracting one of the pair of pixel signals for focus detection from the pixel signal for image to generate another of the pair of pixel signals for focus detection when the second readout is performed.

17. A computer-readable non-transitory recording medium in which a control program for an image pickup apparatus is recorded, the image pickup apparatus including an image pickup section including at least one pixel for image corresponding to a micro-lens, the pixel for image being divided into a plurality of pixels for focus detection that respectively photoelectrically convert light beams passing regions formed by dividing an exit pupil of a photographing optical system into a plurality of pupils and generate photoelectric conversion signals, the image pickup section generating a pixel signal for image and pixel signals for focus detection on the basis of the photoelectric conversion signals,
the control program controlling the image pickup section to
perform, in a frame, first readout for generating both of a pair of the pixel signals for focus detection in a first pupil dividing direction on the basis of the photoelectric conversion signals and reading out the pair of pixel signals for focus detection and
perform, in another frame, second readout for generating one of the pair of pixel signals for focus detection in a second pupil dividing direction on the basis of the photoelectric conversion signals, adding up all the photoelectric conversion signals generated in the one pixel for image to generate the pixel signal for image, reading out the generated one of the pair of pixel signals for focus detection and reading out pixel signal for image.

18. The computer-readable non-transitory recording medium in which the control program for the image pickup apparatus is recorded according to claim 17, wherein the control program controls the image pickup section to perform the first readout when the pixel signals for focus detection are prioritized over the pixel signal for image and controls the image pickup section to perform the second readout when the pixel signal for image is prioritized over the pixel signals for focus detection.

19. The computer-readable non-transitory recording medium in which the control program for the image pickup apparatus is recorded according to claim 17, wherein the control program controls the image pickup section to perform, in yet another frame, third readout for adding up all the photoelectric conversion signals generated in the one pixel for image to generate the pixel signal for image and reading out only the generated pixel signal for image.

20. The computer-readable non-transitory recording medium in which the control program for the image pickup apparatus is recorded according to claim 19, wherein the control program controls the image pickup section to perform the third readout when the pixel signals for focus detection are unnecessary.

* * * * *